United States Patent
Chrisikos et al.

(10) Patent No.: US 9,820,158 B2
(45) Date of Patent: Nov. 14, 2017

(54) MULTI-RADIO INTERFERENCE MITIGATION VIA FREQUENCY SELECTIVITY

(71) Applicant: QUALCOMM Incorporated, San Diego, CA (US)

(72) Inventors: George Chrisikos, San Diego, CA (US); Richard Dominic Wietfeldt, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 80 days.

(21) Appl. No.: 13/762,125

(22) Filed: Feb. 7, 2013

(65) Prior Publication Data
US 2014/0050146 A1    Feb. 20, 2014

Related U.S. Application Data

(60) Provisional application No. 61/635,414, filed on Apr. 19, 2012, provisional application No. 61/607,816, filed on Mar. 7, 2012.

(51) Int. Cl.
| | |
|---|---|
| *H04W 16/14* | (2009.01) |
| *H04W 72/12* | (2009.01) |
| *H04W 88/04* | (2009.01) |
| *H04W 88/06* | (2009.01) |

(52) U.S. Cl.
CPC ....... *H04W 16/14* (2013.01); *H04W 72/1231* (2013.01); *H04W 72/1215* (2013.01); *H04W 88/04* (2013.01); *H04W 88/06* (2013.01)

(58) Field of Classification Search
CPC ...... H04W 16/14; H04W 72/08; H04W 88/06
USPC .......................... 370/328, 329, 252; 455/63.1
See application file for complete search history.

(56) References Cited

U.S. PATENT DOCUMENTS

| | | |
|---|---|---|
| 7,299,005 B1 | 11/2007 | Yarkosky et al. |
| 7,941,178 B2 | 5/2011 | Guo et al. |
| 7,949,364 B2 | 5/2011 | Kasslin et al. |
| 8,131,209 B1 | 3/2012 | Chen et al. |
| 8,155,695 B2 | 4/2012 | Wang et al. |
| 8,200,161 B2 | 6/2012 | Walley et al. |
| 8,379,551 B2 | 2/2013 | Wietfeldt et al. |
| 8,537,724 B2 | 9/2013 | Love et al. |

(Continued)

FOREIGN PATENT DOCUMENTS

| | | |
|---|---|---|
| EP | 1220460 A2 | 7/2002 |
| EP | 2146541 A1 | 1/2010 |

(Continued)

OTHER PUBLICATIONS

International Search Report and Written Opinion—PCT/US2013/025429—ISA/EPO—Jun. 20, 2013.

(Continued)

*Primary Examiner* — Jamal Javaid
(74) *Attorney, Agent, or Firm* — Seyfarth Shaw LLP

(57) ABSTRACT

A user equipment (UE) may mitigate interference on the user equipment with two or more radios. In some instances, the UE may determine when communications of the two or more radios experience interference, in which two radios of the two or more radios operate with the same radio access technology. Further, the UE may alter an operating frequency of a first radio of the two radios to mitigate the interference.

22 Claims, 16 Drawing Sheets

(56) References Cited

U.S. PATENT DOCUMENTS

| | | |
|---|---|---|
| 8,559,383 B2 | 10/2013 | Zetterman et al. |
| 8,559,961 B2 | 10/2013 | Boudreau et al. |
| 8,805,303 B2 | 8/2014 | Koo et al. |
| 8,831,611 B2 | 9/2014 | Koo et al. |
| 8,848,596 B2 | 9/2014 | Shin et al. |
| 8,953,476 B2 | 2/2015 | Zhao et al. |
| 9,161,233 B2 | 10/2015 | Wang et al. |
| 2004/0127191 A1* | 7/2004 | Matsunaga .................. 455/403 |
| 2004/0160908 A1 | 8/2004 | Perlman |
| 2006/0084383 A1 | 4/2006 | Ibrahim et al. |
| 2006/0135076 A1 | 6/2006 | Honkanen et al. |
| 2006/0217071 A1* | 9/2006 | Russo et al. ................ 455/66.1 |
| 2007/0080781 A1 | 4/2007 | Ginzburg et al. |
| 2007/0099567 A1 | 5/2007 | Chen et al. |
| 2008/0045152 A1* | 2/2008 | Boes .......................... 455/63.1 |
| 2008/0057967 A1 | 3/2008 | Goldsmith |
| 2008/0240021 A1 | 10/2008 | Guo et al. |
| 2009/0086712 A1 | 4/2009 | Liu et al. |
| 2009/0176454 A1 | 7/2009 | Chen et al. |
| 2009/0180451 A1 | 7/2009 | Alpert et al. |
| 2009/0264077 A1 | 10/2009 | Damnjanovic |
| 2010/0029215 A1 | 2/2010 | Honkanen et al. |
| 2010/0219250 A1 | 9/2010 | Wang et al. |
| 2010/0309825 A1 | 12/2010 | Zhang |
| 2010/0322287 A1 | 12/2010 | Truong et al. |
| 2011/0038311 A1 | 2/2011 | Marin et al. |
| 2011/0044218 A1 | 2/2011 | Kaur et al. |
| 2011/0243047 A1 | 10/2011 | Dayal et al. |
| 2011/0312288 A1 | 12/2011 | Fu et al. |
| 2012/0020231 A1 | 1/2012 | Chen et al. |
| 2012/0069766 A1 | 3/2012 | Fu et al. |
| 2012/0082140 A1 | 4/2012 | Lin et al. |
| 2012/0164948 A1 | 6/2012 | Narasimha et al. |
| 2012/0170557 A1 | 7/2012 | Tsfati et al. |
| 2012/0195298 A1* | 8/2012 | Kuo ........................ H04W 4/06 370/338 |
| 2012/0207040 A1* | 8/2012 | Comsa .............. H04W 72/1215 370/252 |
| 2013/0029704 A1* | 1/2013 | Koo et al. .................... 455/501 |
| 2013/0107792 A1 | 5/2013 | Lam |
| 2013/0114583 A1* | 5/2013 | Park et al. .................... 370/338 |
| 2013/0155931 A1 | 6/2013 | Prajapati et al. |
| 2013/0235814 A1 | 9/2013 | Wietfeldt et al. |
| 2014/0213310 A1 | 7/2014 | Yeh et al. |

FOREIGN PATENT DOCUMENTS

| | | |
|---|---|---|
| JP | 2010081435 A | 4/2010 |
| WO | 2010025678 A1 | 3/2010 |
| WO | 2011054372 A1 | 5/2011 |
| WO | 2011123527 A1 | 10/2011 |
| WO | 2012021879 A2 | 2/2012 |
| WO | 2012064093 A2 | 5/2012 |

OTHER PUBLICATIONS

Kishida A. et al., "A Novel Interference Avoidance Technique on Mobile Wireless Routers Using IEEE802.11n PSMP," IEICE Transactions on Communications, 20100801 Communications Society, Tokyo, JP, vol. E93B, No. 8, Aug. 1, 2010, pp. 2053-2062, XP001558602, ISSN 0916-8516, Doi: 10.1587/Transcom.E93.B. 2053.

Berlemann., et al., "Coexistence and Interworking of IEEE 802.16 and IEEE 802.11 (e), IEEE Vehicular Technology Conference", 2006. VTC 2006-Spring. IEEE 63rd, vol. 1, pp. 27-31,May 7-10, 2006.

* cited by examiner

MULTI-RADIO INTERFERENCE MITIGATION VIA FREQUENCY SELECTIVITY

CROSS-REFERENCE TO RELATED APPLICATION

This application claims the benefit under 35 U.S.C. §119(e) to U.S. Provisional Patent Application No. 61/635,414, entitled, MULTI-RADIO COEXISTENCE, filed on Apr. 19, 2012, in the names of CHRISIKOS, et al., and U.S. Provisional Patent Application No. 61/607,816, filed Mar. 7, 2012 in the names of WIETFELDT, et al., the disclosures of which are expressly incorporated by reference herein in their entireties.

TECHNICAL FIELD

The present description is related, generally, to multi-radio techniques and, more specifically, to coexistence techniques for multi-radio devices.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-single-out or a multiple-in-multiple out (MIMO) system.

Some conventional advanced devices include multiple radios for transmitting/receiving using different Radio Access Technologies (RATs). Examples of RATs include, e.g., Universal Mobile Telecommunications System (UMTS), Global System for Mobile Communications (GSM), cdma2000, WiMAX, WLAN (e.g., WiFi), Bluetooth, LTE, and the like.

An example mobile device includes an LTE User Equipment (UE), such as a fourth generation (4G) mobile phone. Such 4G phone may include various radios to provide a variety of functions for the user. For purposes of this example, the 4G phone includes an LTE radio for voice and data, an IEEE 802.11 (WiFi) radio, a Global Positioning System (GPS) radio, and a Bluetooth radio, where two of the above or all four may operate simultaneously. While the different radios provide useful functionalities for the mobile device, their inclusion in a single device gives rise to coexistence issues. Specifically, operation of one radio may in some cases interfere with operation of another radio through radiative, conductive, resource collision, and/or other interference mechanisms. Coexistence issues include such interference.

This is especially true for the LTE uplink channel, which is adjacent to the Industrial Scientific and Medical (ISM) band and may cause interference therewith. It is noted that Bluetooth and Wireless LAN (WLAN) channels fall within the ISM band. In some instances, a Bluetooth or WLAN error rate can become unacceptable when LTE is active in some channels of Band 7 and Band 40 for some Bluetooth or WLAN channel conditions. In some cases, the simultaneous operation of LTE with Bluetooth can result in disruption in voice services terminating in a Bluetooth headset. Additionally, LTE can be disrupted by WLAN and, or BT transmissions. Such disruption may be unacceptable to the consumer. A similar issue exists when LTE transmissions interfere with GPS.

With reference specifically to LTE, it is noted that a UE communicates with an evolved NodeB (eNB; e.g., a base station for a wireless communications network) to inform the eNB of interference seen by the UE on the downlink. Furthermore, the eNB may be able to estimate interference at the UE using a downlink error rate. In some instances, the eNB and the UE can cooperate to find a solution that reduces interference at the UE, even interference due to radios within the UE itself. However, in conventional LTE, the interference estimates regarding the downlink may not be adequate to comprehensively address interference.

In one instance, an LTE uplink signal interferes with a Bluetooth signal or WLAN signal. However, such interference is not reflected in the downlink measurement reports at the eNB. As a result, unilateral action on the part of the UE (e.g., moving the uplink signal to a different channel) may be thwarted by the eNB, which is not aware of the uplink coexistence issue and seeks to undo the unilateral action. For instance, even if the UE re-establishes the connection on a different frequency channel, the network can still handover the UE back to the original frequency channel that was corrupted by the in-device interference. This is a likely scenario because the desired signal strength on the corrupted channel may sometimes be higher than reflected in the measurement reports of the new channel based on Reference Signal Received Power (RSRP) to the eNB. Hence, a ping-pong effect of being transferred back and forth between the corrupted channel and the desired channel can happen if the eNB uses RSRP reports to make handover decisions.

Other unilateral action on the part of the UE, such as simply stopping uplink communications without coordination of the eNB may cause power loop malfunctions at the eNB. Additional issues that exist in conventional LTE include a general lack of ability on the part of the UE to suggest desired configurations as an alternative to configurations that have coexistence issues. For at least these reasons, uplink coexistence issues at the UE may remain unresolved for a long time period, degrading performance and efficiency for other radios of the UE.

SUMMARY

According to one aspect of the present disclosure, a method for wireless communication includes determining when communications of a plurality of radios experience interference, in which at least two radios of the plurality of radios operate with the same radio access technology. The method may also include altering an operating frequency of a first radio of the at least two radios to mitigate the interference.

According to another aspect of the present disclosure, an apparatus for wireless communication includes means for determining when communications of a plurality of radios experience interference, in which at least two radios of the plurality of radios operate with the same radio access technology. The apparatus may also include means for altering an operating frequency of a first radio of the at least two radios to mitigate the interference.

According to one aspect of the present disclosure, an apparatus for wireless communication includes a memory and a processor(s) coupled to the memory. The processor(s) is configured to determine when communications of a plurality of radios experience interference, in which at least two radios of the plurality of radios operate with the same radio access technology. The processor(s) is also configured to alter an operating frequency of a first radio of the at least two radios to mitigate the interference.

According to one aspect of the present disclosure, a computer program product for wireless communication in a wireless network includes a computer readable medium having non-transitory program code recorded thereon. The program code includes program code to determine when communications of a plurality of radios experience interference, in which at least two radios of the plurality of radios operate with the same radio access technology. The program code also includes program code to alter an operating frequency of a first radio of the at least two radios to mitigate the interference.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Various aspects of the disclosure provide techniques to mitigate coexistence issues in multi-radio devices, where significant in-device coexistence problems can exist between, e.g., the LTE and Industrial Scientific and Medical (ISM) bands (e.g., for BT/WLAN). Coexistence problems may also exist between radios of the same radio access technology (RAT). For example, multiple WLAN radios may potentially experience interference when operating concurrently. To reduce interference from such operation the radios of the same RAT may be controlled to operate in different frequency ranges.

The techniques described herein can be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network can implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network can implement a radio technology such as Global System for Mobile Communications (GSM). An OFDMA network can implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3$^{rd}$ Generation Partnership Project" (3GPP). CDMA2000 is described in documents from an organization named "3$^{rd}$ Generation Partnership Project 2" (3GPP2). These various radio technologies and standards are known in the art. For clarity, certain aspects of the techniques are described below for LTE, and LTE terminology is used in portions of the description below.

Single carrier frequency division multiple access (SC-FDMA), which utilizes single carrier modulation and frequency domain equalization is a technique that can be utilized with various aspects described herein. SC-FDMA has similar performance and essentially the same overall complexity as those of an OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for an uplink multiple access scheme in 3GPP Long Term Evolution (LTE), or Evolved UTRA.

Figure 1:
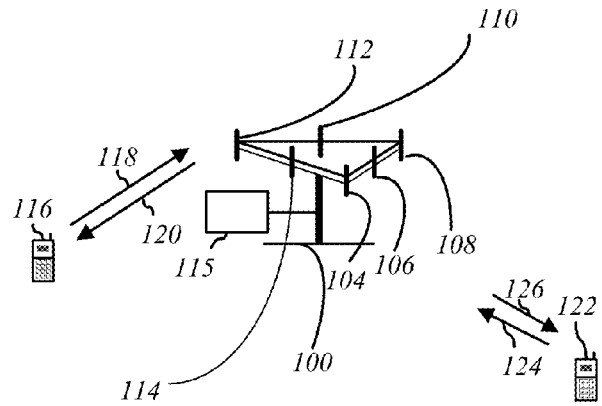
FIG. 1 illustrates a multiple access wireless communication system according to one aspect.

Referring to FIG. 1, a multiple access wireless communication system according to one aspect is illustrated. An evolved Node B 100 (eNB) includes a computer 115 that has processing resources and memory resources to manage the LTE communications by allocating resources and parameters, granting/denying requests from user equipment, and/or the like. The eNB 100 also has multiple antenna groups, one group including antenna 104 and antenna 106, another group including antenna 108 and antenna 110, and an additional group including antenna 112 and antenna 114. In FIG. 1, only two antennas are shown for each antenna group, however, more or fewer antennas can be utilized for each antenna group. A User Equipment (UE) 116 (also referred to as an Access Terminal (AT)) is in communication with antennas 112 and 114, while antennas 112 and 114 transmit information to the UE 116 over an uplink (UL) 188. The UE 122 is in communication with antennas 106 and 108, while antennas 106 and 108 transmit information to the UE 122 over a downlink (DL) 116 and receive information from the UE 122 over an uplink 124. In a frequency division duplex (FDD) system, communication links 118, 120, 124 and 126 can use different frequencies for communication. For example, the downlink 120 can use a different frequency than used by the uplink 118.

Each group of antennas and/or the area in which they are designed to communicate is often referred to as a sector of the eNB. In this aspect, respective antenna groups are designed to communicate to UEs in a sector of the areas covered by the eNB 100.

In communication over the downlinks 120 and 126, the transmitting antennas of the eNB 100 utilize beamforming to improve the signal-to-noise ratio of the uplinks for the different UEs 116 and 122. Also, an eNB using beamforming to transmit to UEs scattered randomly through its coverage causes less interference to UEs in neighboring cells than a UE transmitting through a single antenna to all its UEs.

An eNB can be a fixed station used for communicating with the terminals and can also be referred to as an access point, base station, or some other terminology. A UE can also be called an access terminal, a wireless communication device, terminal, or some other terminology.

Figure 2:
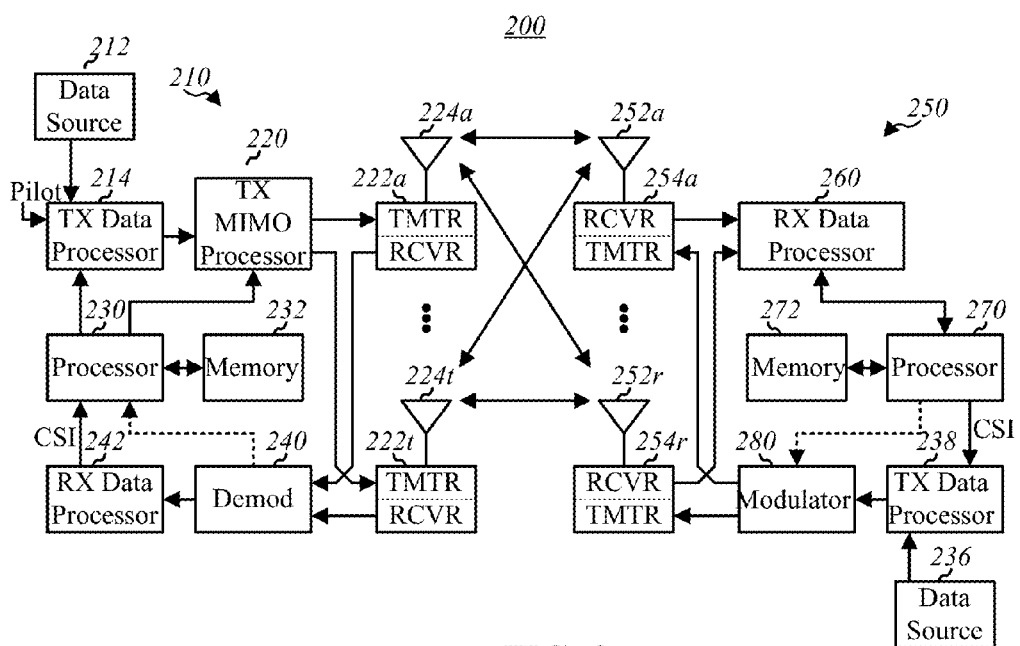
FIG. 2 is a block diagram of a communication system according to one aspect.

FIG. 2 is a block diagram of an aspect of a transmitter system 210 (also known as an eNB) and a receiver system 250 (also known as a UE) in a MIMO system 200. In some instances, both a UE and an eNB each have a transceiver that includes a transmitter system and a receiver system. At the transmitter system 210, traffic data for a number of data streams is provided from a data source 211 to a transmit (TX) data processor 214.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, wherein $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports time division duplex (TDD) and frequency division duplex (FDD) systems. In a TDD system, the uplink and downlink transmissions are on the same frequency region so that the reciprocity principle allows the estimation of the downlink channel from the uplink channel. This enables the eNB to extract transmit beamforming gain on the downlink when multiple antennas are available at the eNB.

In an aspect, each data stream is transmitted over a respective transmit antenna. The TX data processor 214 formats, codes, and interleaves the traffic data for each data stream based on a particular coding scheme selected for that data stream to provide coded data.

The coded data for each data stream can be multiplexed with pilot data using OFDM techniques. The pilot data is a known data pattern processed in a known manner and can be used at the receiver system to estimate the channel response. The multiplexed pilot and coded data for each data stream is then modulated (e.g., symbol mapped) based on a particular modulation scheme (e.g., BPSK, QPSK, M-PSK, or M-QAM) selected for that data stream to provide modulation symbols. The data rate, coding, and modulation for each data stream can be determined by instructions performed by a processor 230 operating with a memory 232.

The modulation symbols for respective data streams are then provided to a TX MIMO processor 220, which can further process the modulation symbols (e.g., for OFDM). The TX MIMO processor 220 then provides $N_T$ modulation symbol streams to $N_T$ transmitters (TMTR) 222$a$ through 222$t$. In certain aspects, the TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from the transmitters 222$a$ through 222$t$ are then transmitted from $N_T$ antennas 224$a$ through 224$t$, respectively.

At a receiver system 250, the transmitted modulated signals are received by $N_R$ antennas 252$a$ through 252$r$ and the received signal from each antenna 252 is provided to a respective receiver (RCVR) 254$a$ through 254$r$. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_R$ "detected" symbol streams. The RX data processor 260 then demodulates, deinterleaves, and decodes each detected symbol stream to recover the traffic data for the data stream. The processing by the RX data processor 260 is complementary to the processing performed by the TX MIMO processor 220 and the TX data processor 214 at the transmitter system 210.

A processor 270 (operating with a memory 272) periodically determines which pre-coding matrix to use (discussed below). The processor 270 formulates an uplink message having a matrix index portion and a rank value portion.

The uplink message can include various types of information regarding the communication link and/or the received data stream. The uplink message is then processed by a TX data processor 238, which also receives traffic data for a number of data streams from a data source 236, modulated by a modulator 280, conditioned by transmitters 254a through 254r, and transmitted back to the transmitter system 210.

At the transmitter system 210, the modulated signals from the receiver system 250 are received by antennas 224, conditioned by receivers 222, demodulated by a demodulator 240, and processed by an RX data processor 242 to extract the uplink message transmitted by the receiver system 250. The processor 230 then determines which pre-coding matrix to use for determining the beamforming weights, then processes the extracted message.

Figure 3:
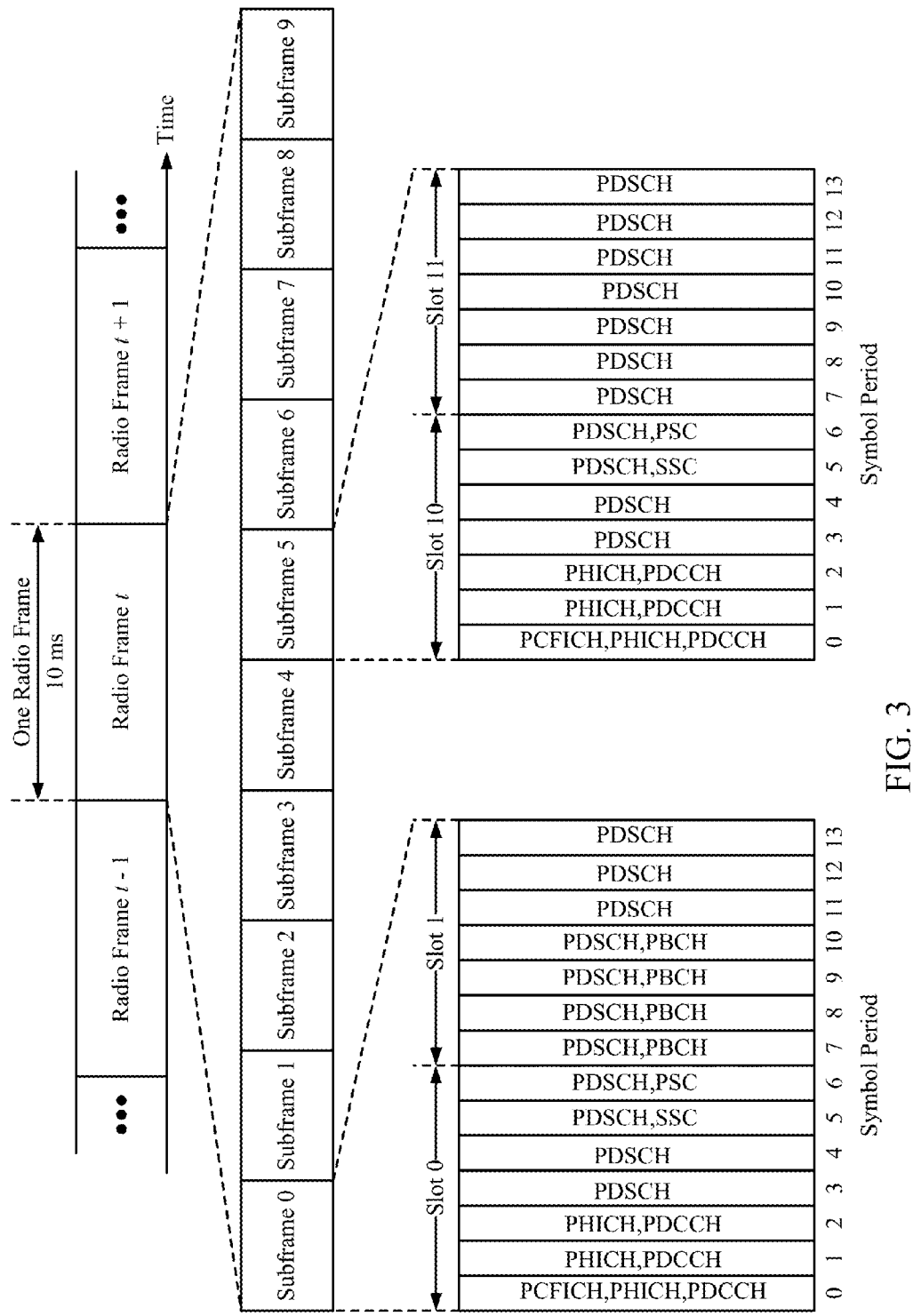
FIG. 3 illustrates an exemplary frame structure in downlink Long Term Evolution (LTE) communications.

FIG. 3 is a block diagram conceptually illustrating an exemplary frame structure in downlink Long Term Evolution (LTE) communications. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 3) or 6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 11 subcarriers) in one slot.

In LTE, an eNB may send a Primary Synchronization Signal (PSS) and a Secondary Synchronization Signal (SSS) for each cell in the eNB. The PSS and SSS may be sent in symbol periods 6 and 5, respectively, in each of subframes 0 and 5 of each radio frame with the normal cyclic prefix, as shown in FIG. 3. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Cell-specific Reference Signal (CRS) for each cell in the eNB. The CRS may be sent in symbols 0, 1, and 4 of each slot in case of the normal cyclic prefix, and in symbols 0, 1, and 3 of each slot in case of the extended cyclic prefix. The CRS may be used by UEs for coherent demodulation of physical channels, timing and frequency tracking, Radio Link Monitoring (RLM), Reference Signal Received Power (RSRP), and Reference Signal Received Quality (RSRQ) measurements, etc.

The eNB may send a Physical Control Format Indicator Channel (PCFICH) in the first symbol period of each subframe, as seen in FIG. 3. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 3, M=3. The eNB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 3. The PHICH may carry information to support Hybrid Automatic Repeat Request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 4:
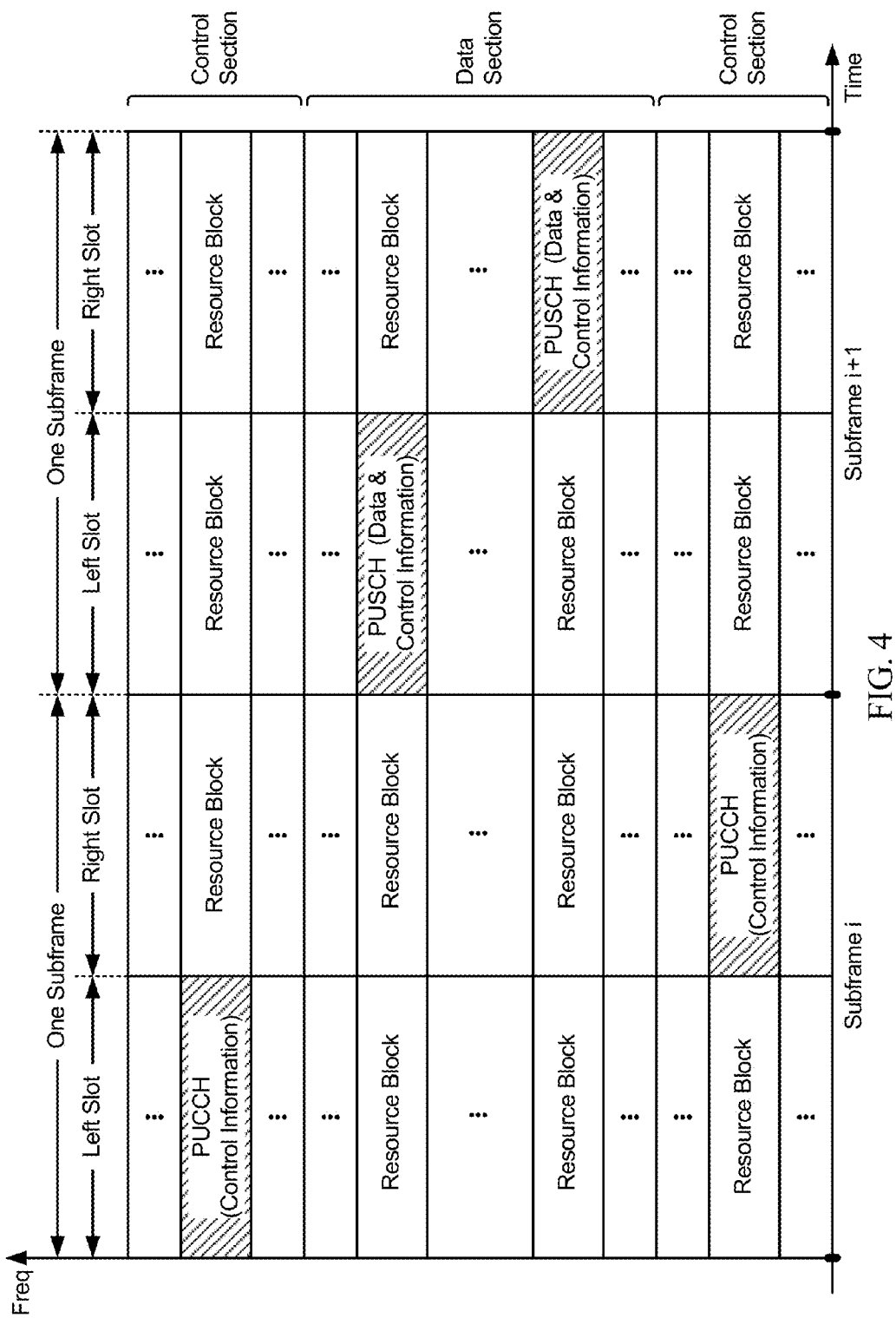
FIG. 4 is a block diagram conceptually illustrating an exemplary frame structure in uplink Long Term Evolution (LTE) communications.

FIG. 4 is a block diagram conceptually illustrating an exemplary frame structure in uplink Long Term Evolution (LTE) communications. The available Resource Blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 4 results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the eNodeB. The UE may transmit control information in a Physical Uplink Control Channel (PUCCH) on the assigned resource blocks in the control section. The UE may transmit only data or both data and control information in a Physical Uplink Shared Channel (PUSCH) on the assigned resource blocks in the data section. An uplink transmission may span both slots of a subframe and may hop across frequency as shown in FIG. 4.

The PSS, SSS, CRS, PBCH, PUCCH and PUSCH in LTE are described in 3GPP TS 36.211, entitled "Evolved Universal Terrestrial Radio Access (E-UTRA); Physical Channels and Modulation," which is publicly available.

In an aspect, described herein are systems and methods for providing support within a wireless communication environment, such as a 3GPP LTE environment or the like, to facilitate multi-radio coexistence solutions.

Figure 5:
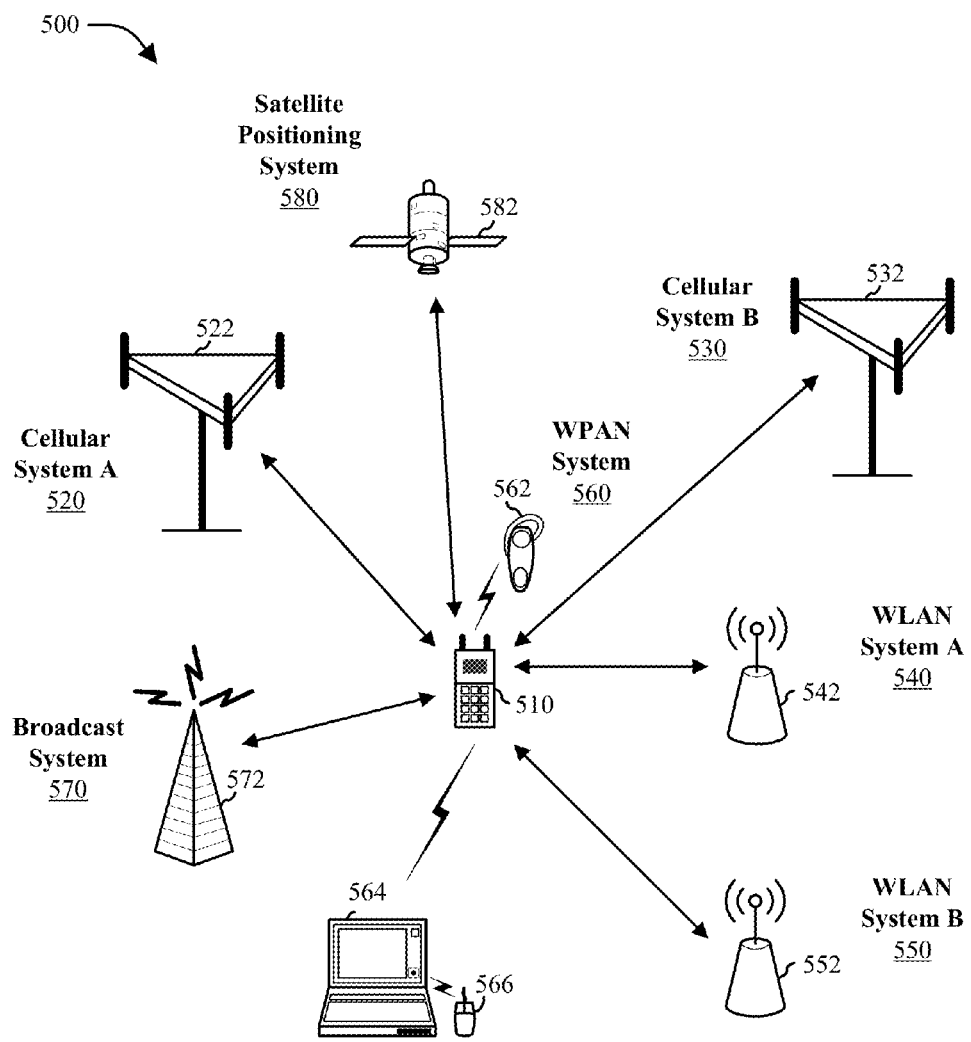
FIG. 5 illustrates an example wireless communication environment.

Referring now to FIG. 5, illustrated is an example wireless communication environment 500 in which various aspects described herein can function. The wireless communication environment 500 can include a wireless device 510, which can be capable of communicating with multiple communication systems. These systems can include, for example, one or more cellular systems 520 and/or 530, one or more WLAN systems 540 and/or 550, one or more wireless personal area network (WPAN) systems 560, one or more broadcast systems 570, one or more satellite positioning systems 580, other systems not shown in FIG. 5, or any combination thereof. It should be appreciated that in the following description the terms "network" and "system" are often used interchangeably.

The cellular systems 520 and 530 can each be a CDMA, TDMA, FDMA, OFDMA, Single Carrier FDMA (SC-FDMA), or other suitable system. A CDMA system can implement a radio technology such as Universal Terrestrial Radio Access (UTRA), cdma2000, etc. UTRA includes Wideband CDMA (WCDMA) and other variants of CDMA. Moreover, cdma2000 covers IS-2000 (CDMA2000 1x), IS-95 and IS-856 (HRPD) standards. A TDMA system can implement a radio technology such as Global System for Mobile Communications (GSM), Digital Advanced Mobile Phone System (D-AMPS), etc. An OFDMA system can implement a radio technology such as Evolved UTRA (E-UTRA), Ultra Mobile Broadband (UMB), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3$^{rd}$ Generation Partnership Project" (3GPP). cdma2000 and UMB are described in documents from an organization named "3$^{rd}$ Generation Partnership Project 2" (3GPP2). In an aspect, the cellular system 520 can include a number of base stations 522, which can support bi-directional communication for wireless devices within their coverage. Similarly, the cellular system 530 can include a number of base stations 532 that can support bi-directional communication for wireless devices within their coverage.

WLAN systems 540 and 550 can respectively implement radio technologies such as IEEE 802.11 (WiFi), Hiperlan, etc. The WLAN system 540 can include one or more access points 542 that can support bi-directional communication. Similarly, the WLAN system 550 can include one or more access points 552 that can support bi-directional communication. The WPAN system 560 can implement a radio technology such as Bluetooth (BT), IEEE 802.15, etc.

Further, the WPAN system 560 can support bi-directional communication for various devices such as wireless device 510, a headset 562, a computer 564, a mouse 566, or the like.

The broadcast system 570 can be a television (TV) broadcast system, a frequency modulation (FM) broadcast system, a digital broadcast system, etc. A digital broadcast system can implement a radio technology such as MediaFLO™, Digital Video Broadcasting for Handhelds (DVB-H), Integrated Services Digital Broadcasting for Terrestrial Television Broadcasting (ISDB-T), or the like. Further, the broadcast system 570 can include one or more broadcast stations 572 that can support one-way communication.

The satellite positioning system 580 can be the United States Global Positioning System (GPS), the European Galileo system, the Russian GLONASS system, the Quasi-Zenith Satellite System (QZSS) over Japan, the Indian Regional Navigational Satellite System (IRNSS) over India, the Beidou system over China, and/or any other suitable system. Further, the satellite positioning system 580 can include a number of satellites 582 that transmit signals for position determination.

In an aspect, the wireless device 510 can be stationary or mobile and can also be referred to as a user equipment (UE), a mobile station, a mobile equipment, a terminal, an access terminal, a subscriber unit, a station, etc. The wireless device 510 can be cellular phone, a personal digital assistance (PDA), a wireless modem, a handheld device, a laptop computer, a cordless phone, a wireless local loop (WLL) station, etc. In addition, a wireless device 510 can engage in two-way communication with the cellular system 520 and/or 530, the WLAN system 540 and/or 550, devices with the WPAN system 560, and/or any other suitable systems(s) and/or devices(s). The wireless device 510 can additionally or alternatively receive signals from the broadcast system 570 and/or satellite positioning system 580. In general, it can be appreciated that the wireless device 510 can communicate with any number of systems at any given moment. Also, the wireless device 510 may experience coexistence issues among various ones of its constituent radio devices that operate at the same time. Accordingly, device 510 includes a coexistence manager (CxM, not shown) that has a functional module to detect and mitigate coexistence issues, as explained further below.

Figure 6:
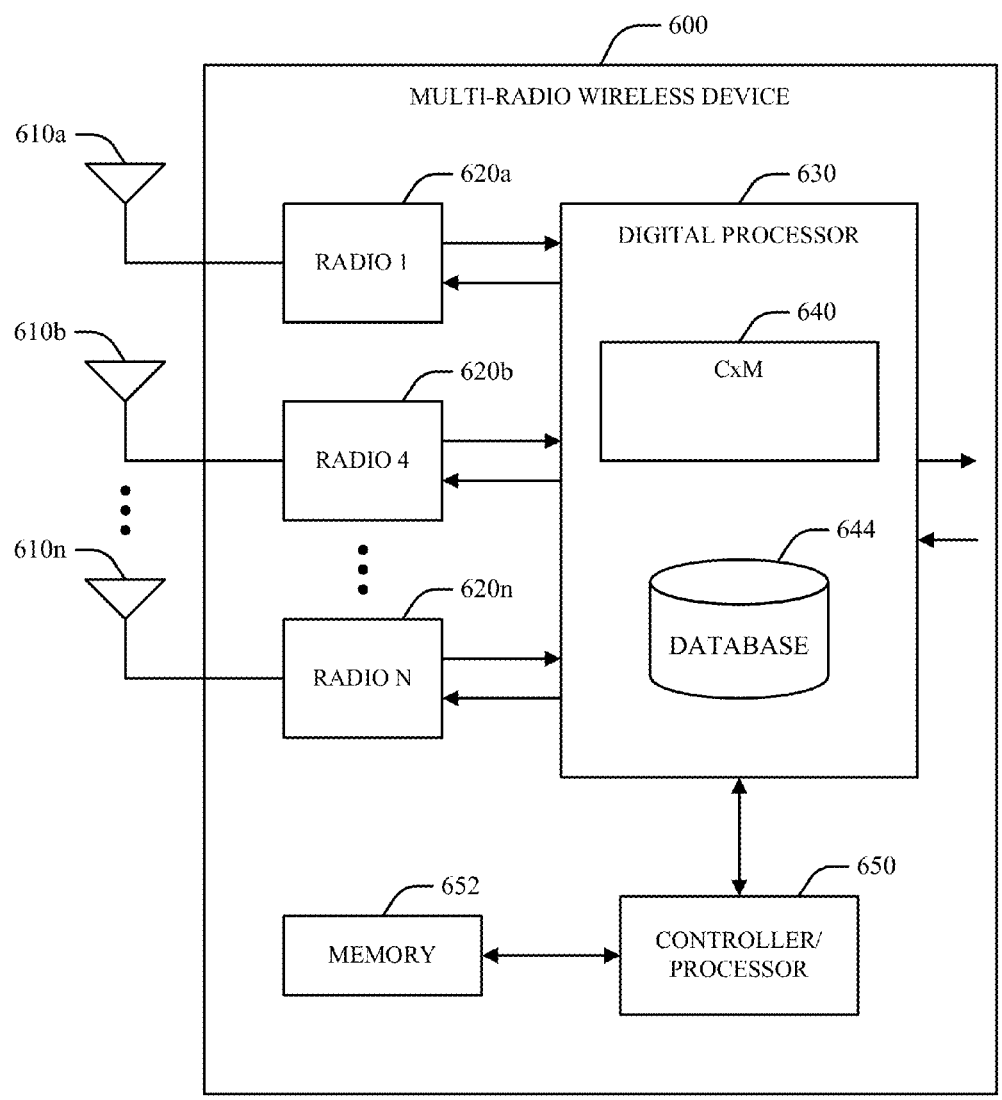
FIG. 6 is a block diagram of an example design for a multi-radio wireless device.

Turning next to FIG. 6, a block diagram is provided that illustrates an example design for a multi-radio wireless device 600 and may be used as an implementation of the radio or wireless device 510 of FIG. 5. As FIG. 6 illustrates, the wireless device 600 can include N radios 620$a$ through 620$n$, which can be coupled to N antennas 610$a$ through 610$n$, respectively, where N can be any integer value. It should be appreciated, however, that respective radios 620 can be coupled to any number of antennas 610 and that multiple radios 620 can also share a given antenna 610.

In general, a radio 620 can be a unit that radiates or emits energy in an electromagnetic spectrum, receives energy in an electromagnetic spectrum, or generates energy that propagates via conductive means. By way of example, a radio 620 can be a unit that transmits a signal to a system or a device or a unit that receives signals from a system or device. Accordingly, it can be appreciated that a radio 620 can be utilized to support wireless communication. In another example, a radio 620 can also be a unit (e.g., a screen on a computer, a circuit board, etc.) that emits noise, which can impact the performance of other radios. Accordingly, it can be further appreciated that a radio 620 can also be a unit that emits noise and interference without supporting wireless communication.

In an aspect, respective radios 620 can support communication with one or more systems. Multiple radios 620 can additionally or alternatively be used for a given system, e.g., to transmit or receive on different frequency bands (e.g., cellular and PCS bands).

In another aspect, a digital processor 630 can be coupled to radios 620a through 620n and can perform various functions, such as processing for data being transmitted or received via the radios 620. The processing for each radio 620 can be dependent on the radio technology supported by that radio and can include encryption, encoding, modulation, etc., for a transmitter; demodulation, decoding, decryption, etc., for a receiver, or the like. In one example, the digital processor 630 can include a coexistence manager (C×M) 640 that can control operation of the radios 620 in order to improve the performance of the wireless device 600 as generally described herein. The coexistence manager 640 can have access to a database 644, which can store information used to control the operation of the radios 620. As explained further below, the coexistence manager 640 can be adapted for a variety of techniques to decrease interference between the radios. In one example, the coexistence manager 640 requests a measurement gap pattern or DRX cycle that allows an ISM radio to communicate during periods of LTE inactivity.

For simplicity, digital processor 630 is shown in FIG. 6 as a single processor. However, it should be appreciated that the digital processor 630 can include any number of processors, controllers, memories, etc. In one example, a controller/processor 650 can direct the operation of various units within the wireless device 600. Additionally or alternatively, a memory 652 can store program codes and data for the wireless device 600. The digital processor 630, controller/processor 650, and memory 652 can be implemented on one or more integrated circuits (ICs), application specific integrated circuits (ASICs), etc. By way of specific, non-limiting example, the digital processor 630 can be implemented on a Mobile Station Modem (MSM) ASIC.

Figure 7:
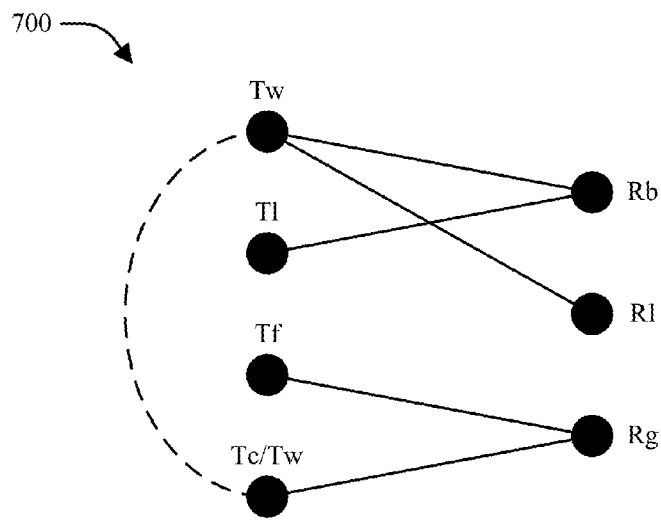
FIG. 7 is graph showing respective potential collisions between seven example radios in a given decision period.

In an aspect, the coexistence manager 640 can manage operation of respective radios 620 utilized by wireless device 600 in order to avoid interference and/or other performance degradation associated with collisions between respective radios 620. coexistence manager 640 may perform one or more processes, such as those illustrated in FIG. 11. By way of further illustration, a graph 700 in FIG. 7 represents respective potential collisions between seven example radios in a given decision period. In the example shown in graph 700, the seven radios include a WLAN transmitter (Tw), an LTE transmitter (Tl), an FM transmitter (Tf), a GSM/WCDMA transmitter (Tc/Tw), an LTE receiver (Rl), a Bluetooth receiver (Rb), and a GPS receiver (Rg). The four transmitters are represented by four nodes on the left side of the graph 700. The four receivers are represented by three nodes on the right side of the graph 700.

A potential collision between a transmitter and a receiver is represented on the graph 700 by a branch connecting the node for the transmitter and the node for the receiver. Accordingly, in the example shown in the graph 700, collisions may exist between (1) the WLAN transmitter (Tw) and the Bluetooth receiver (Rb); (2) the LTE transmitter (Tl) and the Bluetooth receiver (Rb); (3) the WLAN transmitter (Tw) and the LTE receiver (Rl); (4) the FM transmitter (TO and the GPS receiver (Rg); (5) a WLAN transmitter (Tw), a GSM/WCDMA transmitter (Tc/Tw), and a GPS receiver (Rg).

Figure 8:
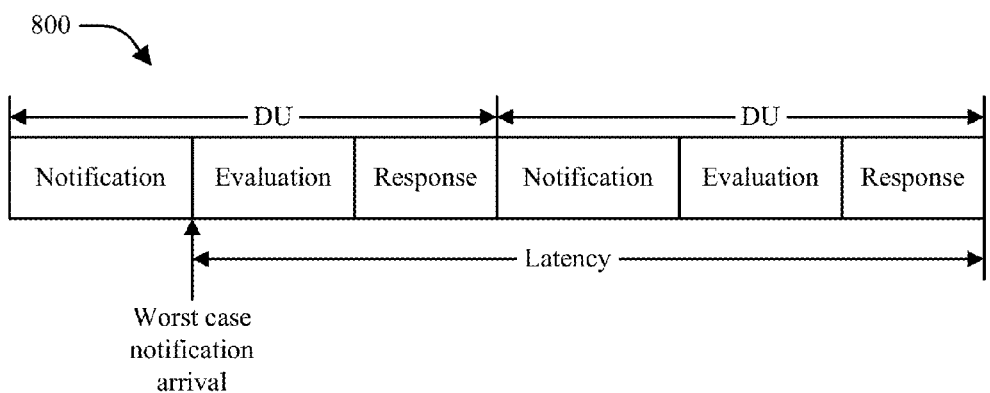
FIG. 8 is a diagram showing operation of an example Coexistence Manager (C×M) over time.

In one aspect, an example coexistence manager 640 can operate in time in a manner such as that shown by diagram 800 in FIG. 8. As diagram 800 illustrates, a timeline for coexistence manager operation can be divided into Decision Units (DUs), which can be any suitable uniform or non-uniform length (e.g., 100 μs) where notifications are processed, and a response phase (e.g., 20 μs) where commands are provided to various radios 620 and/or other operations are performed based on actions taken in the evaluation phase. In one example, the timeline shown in the diagram 800 can have a latency parameter defined by a worst case operation of the timeline, e.g., the timing of a response in the case that a notification is obtained from a given radio immediately following termination of the notification phase in a given DU.

Figure 9:
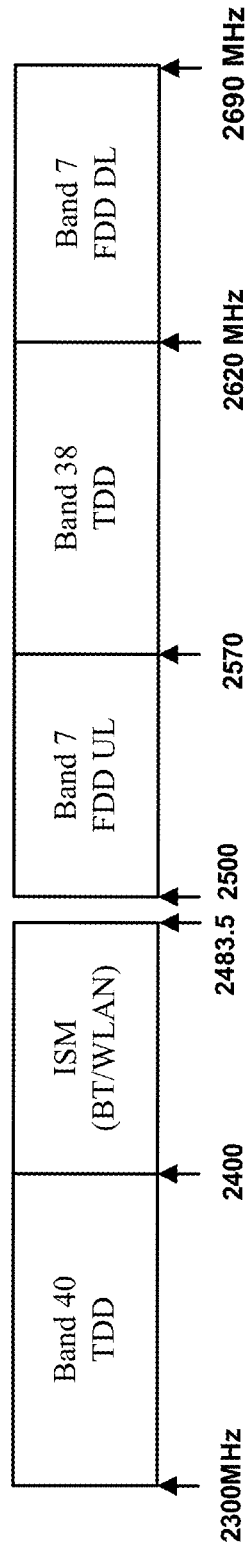
FIG. 9 is a block diagram illustrating adjacent frequency bands.

As shown in FIG. 9, Long Term Evolution (LTE) in band 7 (for frequency division duplex (FDD) uplink), band 40 (for time division duplex (TDD) communication), and band 38 (for TDD downlink) is adjacent to the 2.4 GHz Industrial Scientific and Medical (ISM) band used by Bluetooth (BT) and Wireless Local Area Network (WLAN) technologies. Frequency planning for these bands is such that there is limited or no guard band permitting traditional filtering solutions to avoid interference at adjacent frequencies. For example, a 20 MHz guard band exists between ISM and band 7, but no guard band exists between ISM and band 40.

To be compliant with appropriate standards, communication devices operating over a particular band are to be operable over the entire specified frequency range. For example, in order to be LTE compliant, a mobile station/user equipment should be able to communicate across the entirety of both band 40 (2300-2400 MHz) and band 7 (2500-2570 MHz) as defined by the 3rd Generation Partnership Project (3GPP). Without a sufficient guard band, devices employ filters that overlap into other bands causing band interference. Because band 40 filters are 100 MHz wide to cover the entire band, the rollover from those filters crosses over into the ISM band causing interference. Similarly, ISM devices that use the entirety of the ISM band (e.g., from 2401 through approximately 2480 MHz) will employ filters that rollover into the neighboring band 40 and band 7 and may cause interference.

In-device coexistence problems can exist with respect to a UE between resources such as, for example, LTE and ISM bands (e.g., for Bluetooth/WLAN). In current LTE implementations, any interference issues to LTE are reflected in the downlink measurements (e.g., Reference Signal Received Quality (RSRQ) metrics, etc.) reported by a UE and/or the downlink error rate which the eNB can use to make inter-frequency or inter-RAT handoff decisions to, e.g., move LTE to a channel or RAT with no coexistence issues. However, it can be appreciated that these existing techniques will not work if, for example, the LTE uplink is causing interference to Bluetooth/WLAN but the LTE downlink does not see any interference from Bluetooth/WLAN. More particularly, even if the UE autonomously moves itself to another channel on the uplink, the eNB can in some cases handover the UE back to the problematic channel for load balancing purposes. In any case, it can be appreciated that existing techniques do not facilitate use of the bandwidth of the problematic channel in the most efficient way.

Figure 10:
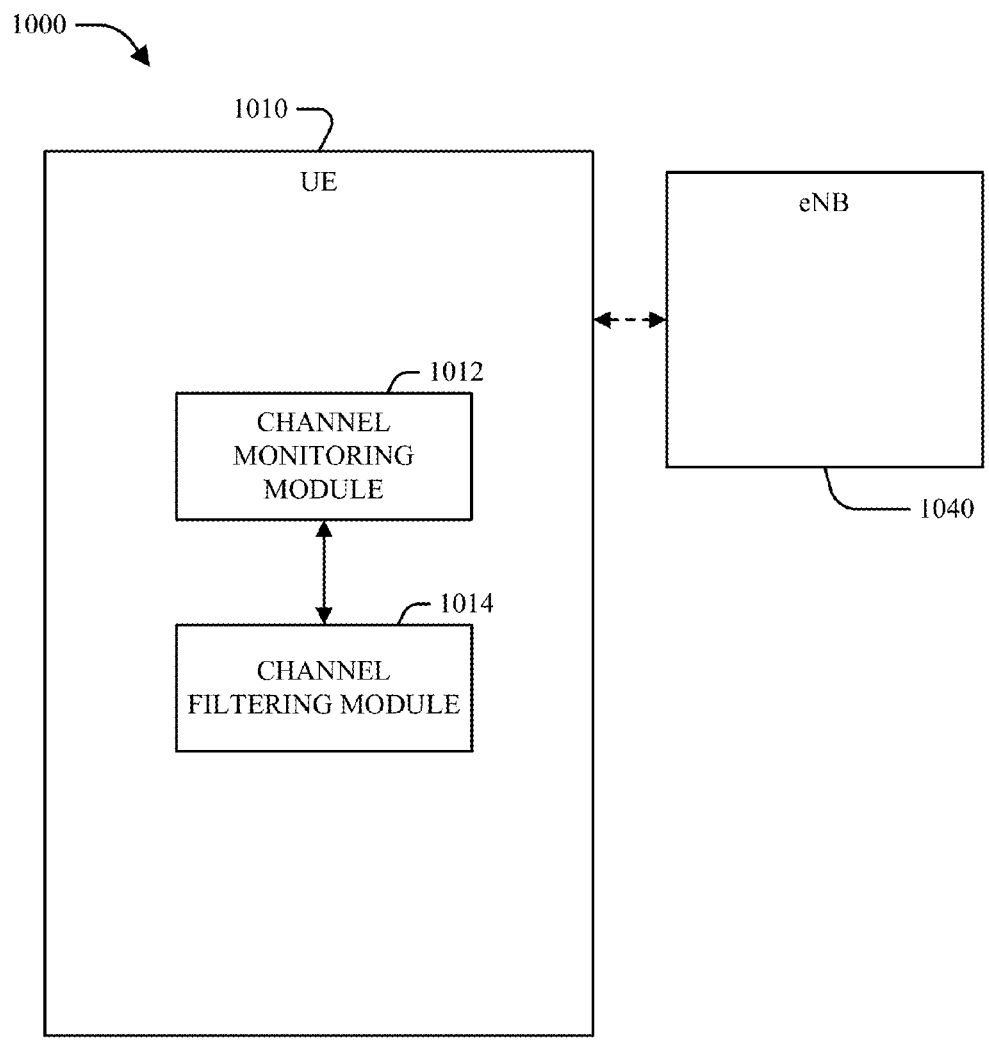
FIG. 10 is a block diagram of a system for providing support within a wireless communication environment for multi-radio coexistence management according to one aspect of the present disclosure.

Turning now to FIG. 10, a block diagram of a system 1000 for providing support within a wireless communication environment for multi-radio coexistence management is illustrated. In an aspect, the system 1000 can include one or more UEs 1010 and/or eNBs 1040, which can engage in uplink and/or downlink communications, and/or any other suitable communication with each other and/or any other entities in the system 1000. In one example, the UE 1010 and/or eNB 1040 can be operable to communicate using a variety resources, including frequency channels and sub-bands, some of which can potentially be colliding with other radio resources (e.g., a broadband radio such as an LTE modem). In another aspect, the system may also include access points and/or external wireless devices (not shown). Thus, the UE 1010 can utilize various techniques for managing coexistence between multiple radios utilized by the UE 1010, as generally described herein.

To mitigate at least the above shortcomings, the UE 1010 can utilize respective features described herein and illustrated by the system 1000 to facilitate support for multi-radio coexistence within the UE 1010. For example, channel monitoring module 1012 and a channel filtering module 1014 may be provided. The various modules 1012-1014 may, in some examples, be implemented as part of a coexistence manager such as the coexistence manager 640 of FIG. 6. The various modules 1012-1014 and others may be configured to implement the embodiments discussed herein.

When communications of one or more radios of the same or different radio access technology (RAT) in the same or proximate communication spectrum are operating at the same time, potential interference between the radios may occur. It should be noted that in the present disclosure, a RAT may refer to any type of communications radio, such as a WLAN radio or a Bluetooth radio, and is not limited to a cellular radio. Interference may occur when one radio is attempting to receive communications at the same time when another radio is transmitting. For example, if both radios are using the same or proximate portions of a communication spectrum, the receiving radio may experience interference. As another example, a receiving radio may experience interference as a result of intermodulation distortion when both radios are not using proximate portions of a communication spectrum.

For example, a device operating with concurrent LTE and ISM radios may experience potential in-device interference when the LTE and ISM radios operate concurrently. In one example, the LTE and ISM radios may experience potential in-device interference when the LTE radio operates in bands near the ISM bands (e.g., bands 40, 7, 38, and 41). It should be noted that the potential interference is not limited to the LTE radio operating in bands near the ISM bands and may result from concurrent operation of two RATs on a single device. A device may include a coexistence manager (CxM) to mitigate the potential interference between an LTE radio and an ISM radio (e.g., WLAN and/or Bluetooth) by utilizing a technique such as adjusting a time, frequency, and/or power of one of the RATs. The coexistence manager may also mitigate interference between multiple radios of a same RAT.

According to an example, a device, such as a UE, may utilize at least two radios, such as two WLAN radios, that may operate independently of each other. Specifically, a WLAN radio can operate in two modes: access point (AP) mode and station mode. In each mode, the device can engage in uplink (UL) transmissions to another entity (e.g. device or access point) or downlink (DL) receptions from another entity. Thus, a given WLAN radio is capable of two uplink transmissions and two downlink transmissions in a time-multiplexed fashion as determined by a control entity such as a coexistence manager. Similarly, another WLAN radio on the same device may also operate, with time-division multiplexing (TDM) and other coexistence coordination performed by a coexistence manager to coordinate operation with other radios (both WLAN and non-WLAN) in the device.

Generally, a device may include a single WLAN radio operating as an access point and a station. This mode of operation is generally referred to as a MiFi™ or soft access point device. In the present aspect, the device may include two operating WLAN radios.

For example, a first WLAN radio may operate in an access point mode and a second WLAN radio may operate concurrently and/or independently in a station mode. In this example, potential interference may occur when the two radios are operating concurrently and independently in various modes. For example, if the first radio is operating in an access point mode and the second radio is operating in the station mode, a transmission/reception event from the first radio may potentially interfere with a transmission/reception event of the second radio when a time slot for the transmission and the reception overlap.

Proposed is a solution to allow for simultaneous operation of two WLAN radios operating in the same band by use of filters, such as channelization filters, filters for more than two portions of the same band (e.g., low/high band), or filters for simultaneous operation in dual noncontiguous bands. It should be noted that the term low/high band or high/low band refers to an upper (high) portion and a lower (low) portion of a same band (e.g., portions of the 2.4 GHz band or the 5 GHz band).

Figure 11A:
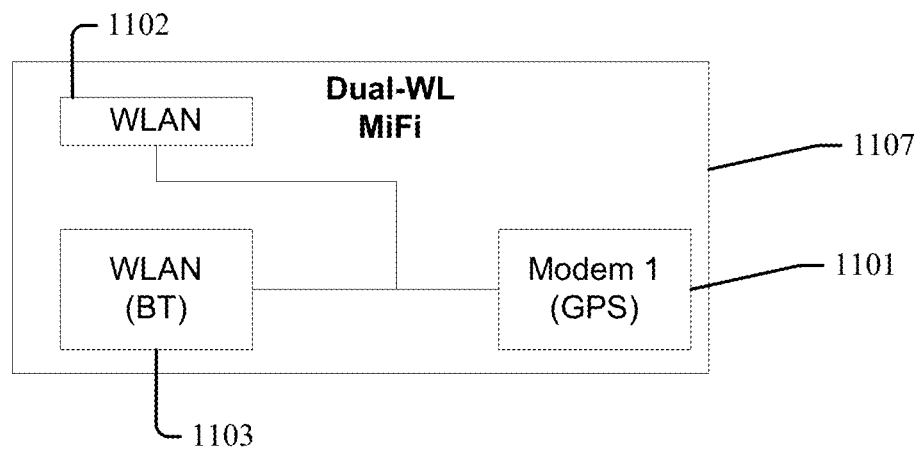
FIGS. 11A and 11B illustrate examples a multi-radio wireless device according to one aspect of the present disclosure.

FIG. 11A illustrates one example of a device utilizing two WLAN radios. As illustrated in FIG. 11A the device 1107 may include a modem 1101 for cellular communication on a network, such as a 2G, 3G, or LTE. The modem 1101 may also include a global positioning system (GPS) radio or other radio. Additionally, the device 1107 may include a first WLAN radio 1102 and a second WLAN radio 1103. The second WLAN radio 1103 may also include a Bluetooth (BT) radio. The first WLAN radio 1102 and the second WLAN radio 1103 may operate on different frequencies, and therefore, the device may be referred to a dual-band device. Alternatively, the first WLAN radio 1102 and the second WLAN radio 1103 may operate on the same band.

Figure 11B:
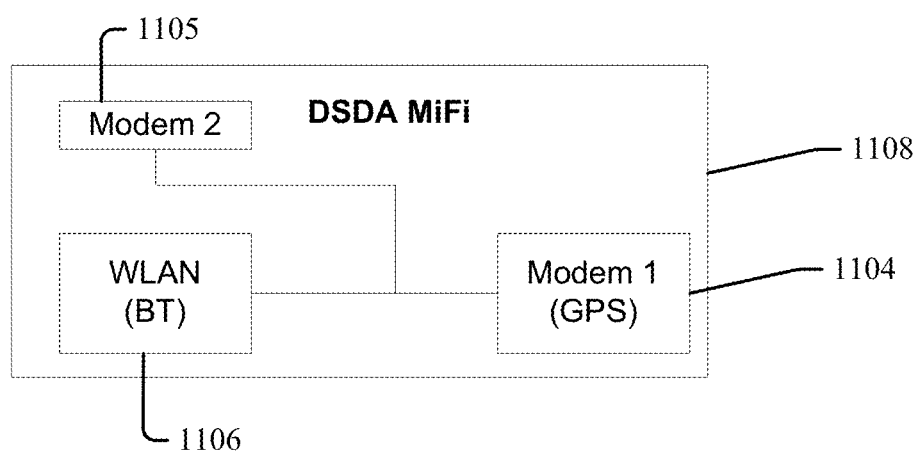

FIG. 11B illustrates another example of a device utilizing two WLAN radios. As illustrated in FIG. 11B the device 1108 may include a first modem 1104. The first modem 1104 may also include a GPS or other radio. Additionally, the device 1108 may include a second modem 1105 that may include a modem for cellular communication on a network, such as 2G, 3G, or LTE, and may also include a first WLAN radio (not shown). The device 1108 may also include a second WLAN radio 1106. The second WLAN radio 1106 may also include a Bluetooth (BT) radio. The first WLAN radio and the second WLAN radio 1106 may operate on different frequencies, and therefore, the device may be referred to a dual-band device. Additionally, the device 1108 may be a dual subscriber identity module (SIM) dual active (DSDA) that may include at least two SIM cards with at least two active transmitters.

A radio, such as a WLAN radio, may operate in a time-division multiplex half-duplex manner so that the transmission and/or reception event time slots are non-overlapping. However, a potential interference may occur when at least two radios that may be operating with the same access technology are disposed on a single device and a transmission and/or reception event of a first radio at least overlaps a transmission and/or reception event of a second radio.

Figure 12:
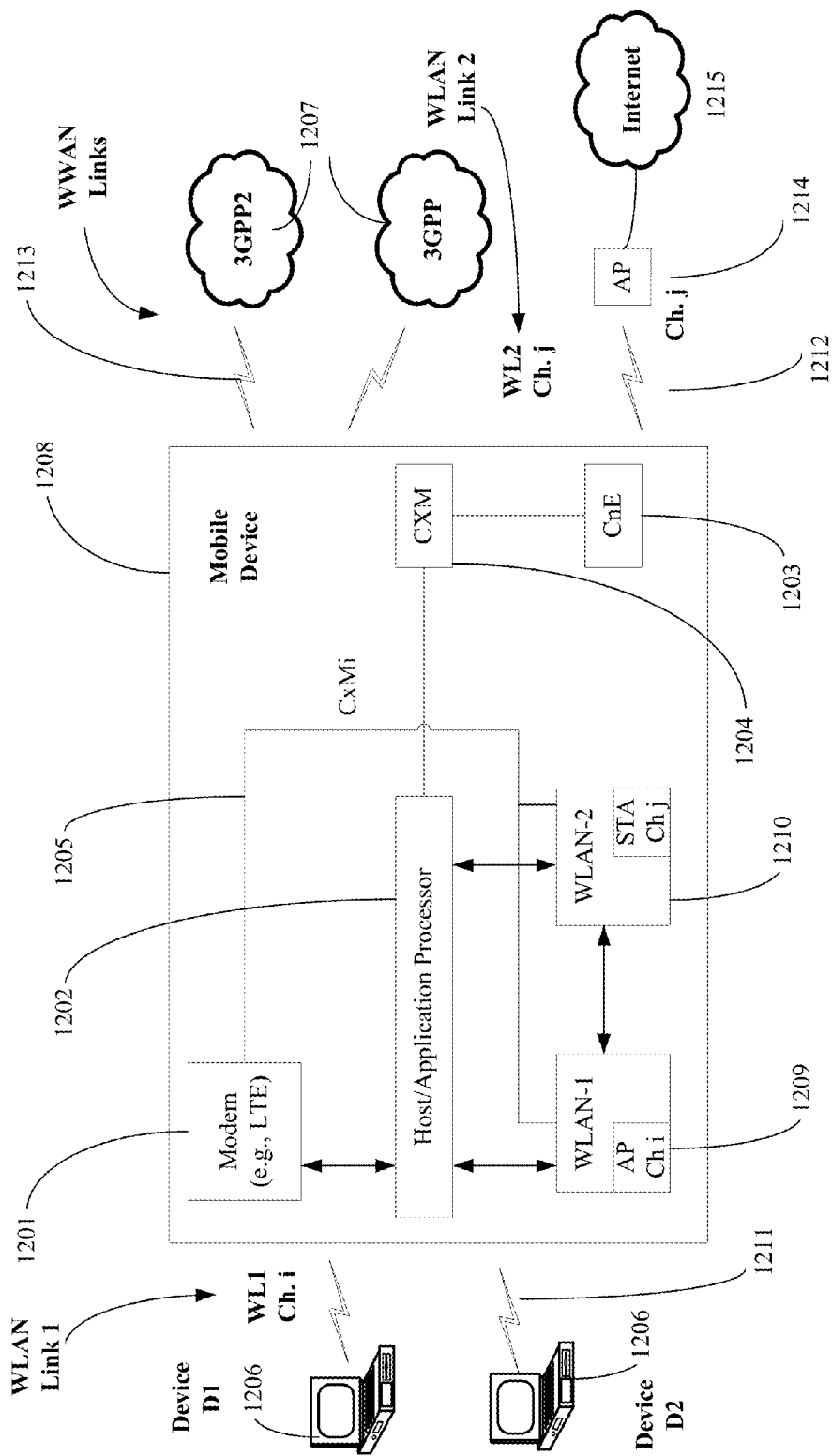
FIG. 12 illustrates an example of a system for providing support within a wireless communication environment for multi-radio coexistence management according to one aspect of the present disclosure.

In one example, a first radio may be configured to operate in an access point mode and a second radio may be configured to operate in a station mode. In this example, the first radio and second radio may be WLAN radios. FIG. 12 illustrates an example of a first WLAN radio configured to operate in an access point and a second WLAN radio configured to operate in a station mode.

FIG. 12 illustrates a mobile device with two WLAN radios operating in a wireless system. As illustrated in FIG. 12, the mobile device 1208 may include a modem 1201 for cellular communications on a network, such as LTE. The mobile device may also include a host/application processor module 1202, a coexistence manager (C×M) 1204, a connectivity engine (CnE) 1203, a coexistence manager interface (C×Mi) 1205, and two WLAN radios 1209, 1210. The coexistence manager 1204 may be the coexistence manager 640 discussed above. The first WLAN radio (WLAN-1) 1209 may operate in a dedicated access point mode on channel i (ch. i) and the second WLAN radio (WLAN-2) 1210 may operate in a dedicated station mode on channel j (ch. j). For example, as illustrated in FIG. 12, WLAN-1 1209 may service devices D1 and D2 1206 on a first WLAN link (WL1) 1211 on channel i. Additionally, WLAN-2 1210 may provide a connection with a remote access point (AP) 1214 via a second WLAN link (WL2) 1212 on channel j. The remote AP 1214 may provide access to the Internet 1215. Furthermore, the mobile device 1208 of FIG. 12 may access 3GPP or 3GPP2 networks 1207 via WWAN links (WW) 1213. It should be noted that according to aspects of the disclosure discussed below, channels i and j may be the same or may be different. Additionally, in this example, channels i and j may also refer to a band for operating each of the WLAN radios 1209, 1210.

According to one aspect, each WLAN radio of a device with two WLAN radios may operate on a different band (e.g., 2.4 or 5 GHz, though other bands may be used). In another aspect, the WLAN radios of a device with two WLAN radios may operate on the same band when a coexistence manager enables WLAN time slot separation for the transmission and/or reception event time slots of each WLAN radio or when the coexistence manager utilizes a frequency selectivity operation. In another aspect, one or more WLAN radios may operate on different frequency bands.

It should be noted that the coexistence manager may adjust transmission and/or reception event timing, band/channel frequency, transmission power levels, and other factors to mitigate potential interference between a first WLAN radio and a second WLAN radio while improving performance factors such as throughput. Furthermore, the coexistence manager may concurrently mitigate interference with other co-located radios such as an LTE radio.

For example, the coexistence manager may determine that communications of a first WLAN radio interfere with communications of a second WLAN radio when the first and second WLAN radios are operating on the same band. In this example, to mitigate the interference, the coexistence manager may alter communications of one of the WLAN radios so that each WLAN radio is operating on a different band (e.g., the first WLAN radio operates on 2.4 GHz and the second WLAN radio operates on 5 GHz).

WLAN radios operating on the 802.11b/g/n standard are specified to operate in the 2.4 GHz band. Furthermore, WLAN radios operating on the 802.11a/n/ac standard are specified to operate in the 5 GHz band. Additionally, Wi-Fi networks are contention-based TDD systems so that the access point and the mobile station operate on the same channel. Therefore, because the access point and mobile station operate on the same channel, Wi-Fi networks are half duplex networks, where the transmit and receive operations may be staggered in time in a TDM configuration.

A typical WLAN radio operating on the IEEE 802.11 standard may use a media access control protocol referred to as Carrier Sense Multiple Access with Collision Avoidance (CSMA/CA) where one side listens to see if a channel is clear. If the channel is clear, transmission may occur, otherwise transmission is held until the channel is clear. Another collision avoidance mechanism, referred to as Distributed Control Function (DCF), may allow a device to transmit when a channel is potentially clear. In a typical system, WLAN transmissions received an acknowledgment from the receiver. Therefore, a device will assume that a collision occurred and will retry the transmission after an interval if the transmitting device does not receive an acknowledgement.

As previously discussed, a WLAN radio may operate in a TDM half duplex manner such that the transmission and/or reception event time slots are non-overlapping. However, when a device includes at least two WLAN radios, the transmission event slot of one WLAN radio may overlap with a reception event slot of another WLAN radio, thus resulting in a potential interference.

In order to mitigate a potential interference, the coexistence manager may control the timing of each radio such that the transmission and/or reception events of each radio are non-overlapping in time with regard to transmission and/or reception events of at least one other radios operating on the same device.

Figure 13:
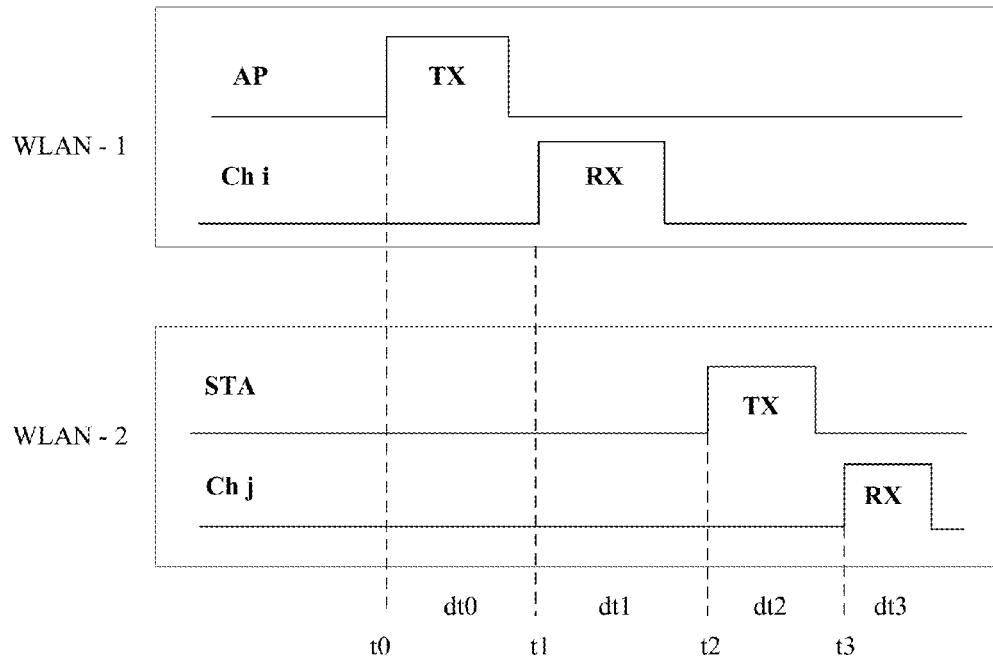
FIGS. 13 and 14 illustrate examples of mitigating interference according to one aspect of the present disclosure.

For example, as illustrated in FIG. 13, a first radio (WLAN-1) may be configured to operate in an access point mode on channel i and a second radio (WLAN-2) may be configured to operate in an station mode on channel j. In this example, the coexistence manager may control the timing of the transmission and/or reception event time slots of each radio over event times t0-t3 and duration times dt0-dt3 such that the transmission and/or reception event time slots of each radio is at least non-overlapping in time. Although not shown in FIG. 13, the coexistence manager may control the radio to operate on the same band in each mode or a different band for each mode.

In the example illustrated in FIG. 13, channel i and channel j may be different channels or the same channel if the transmission and/or reception event time slots of each radio are non-overlapping in time. The solution of mitigating interference by controlling the timing of the transmission and/or reception event time slots of each radio such that the transmission and/or reception event time slots of each radio is at least non-overlapping in time may be incorporated on its own and may be combined in whole or in part with the solutions discussed in co-owned Provisional Patent Application No. 61/607,816, filed Mar. 7, 2012 in the names of WIETFELDT, et al., the disclosure of which is hereby incorporated by reference in its entirety.

According to another solution, the coexistence manager may mitigate potential interference via a frequency selectivity operation. The transmission/reception (TX/RX) events of each radio may overlap in time when the coexistence manager utilizes a frequency selectivity operation, provided that high band filters and low band filters are used in at least one of the WLAN radios.

In one aspect of the disclosure, multiple RATS, e.g., dual WLAN radios can operate simultaneously in different bands. In this aspect, the UE or the coexistence manager of the UE controls the selection of the band. For example, the coexistence manager switches one of the WLAN radios to a different band (e.g., from 2.4 GHz to 5 GHz) to avoid operation of both WLAN radios on the same band. In this aspect, each band pas filter of each WLAN radio corresponds to the selected band for each WLAN radio.

In another aspect, one WLAN radio operates on a high band channel and the other WLAN radio operates on a low band channel in a same band (e.g., 5 GHz band) simultaneously. The high band channel and the low band channel may represent upper and lower portions of the same band. In one aspect, a channelization filtering configuration (e.g., high/low band channelization filtering configuration) is implemented where the high band filter facilitates the operation of one of the WLAN radios on the high band channel and the low band filter facilitates the operation of the other WLAN radio on the low band channel. Although the channelization filtering configuration describes only two filters including the high band filter and the low band filter, the number of filters can be more than two. For example, the filters may include a high band filter, a medium band filter and a low band filter.

In another aspect, a different channelization filtering configuration may be employed, where the channelization band is a specific mid-range frequency band or other band range depending on the desired filter control of the radios. Other filter designs, shapes, bands, and technologies may be configured with wider or narrower responses to select the number of channels in low band, high band, midband, etc. depending on the desired coexistence management design.

Figure 14:
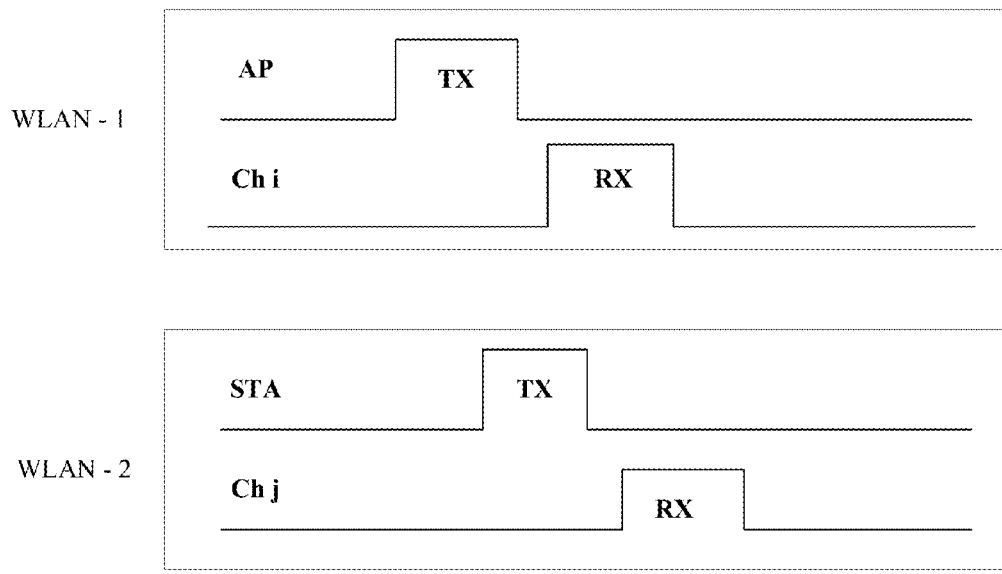

For example, as illustrated in FIG. 14, a first radio (WLAN-1) may be configured to operate in an access point (AP) mode on channel i and a second radio (WLAN-2) may be configured to operate in a station (STA) mode on channel j. In this example, the coexistence manager may utilize a frequency selectivity operation, and therefore, the AP/STA events of each radio may overlap in time. Although not shown in FIG. 14, the coexistence manager may control the radio to operate on the same band in each mode or a different band for each mode.

In the example provided in FIG. 14, WLAN 1 and WLAN 2 may operate in the same band where WLAN 1 operates on a low band channel i while WLAN 2 operates on a high band channel j, or vice versa. Furthermore, a high band filter and low band filter is used on at least one of the WLAN radios.

The frequency selectivity operation enables independent time-operation between the two WLAN radios and provides for a higher throughput in comparison to the solution of controlling the timing of the transmission and/or reception event time slots of each radio such that the transmission and/or reception event time slots of each radio are at least non-overlapping in time.

Figure 15:
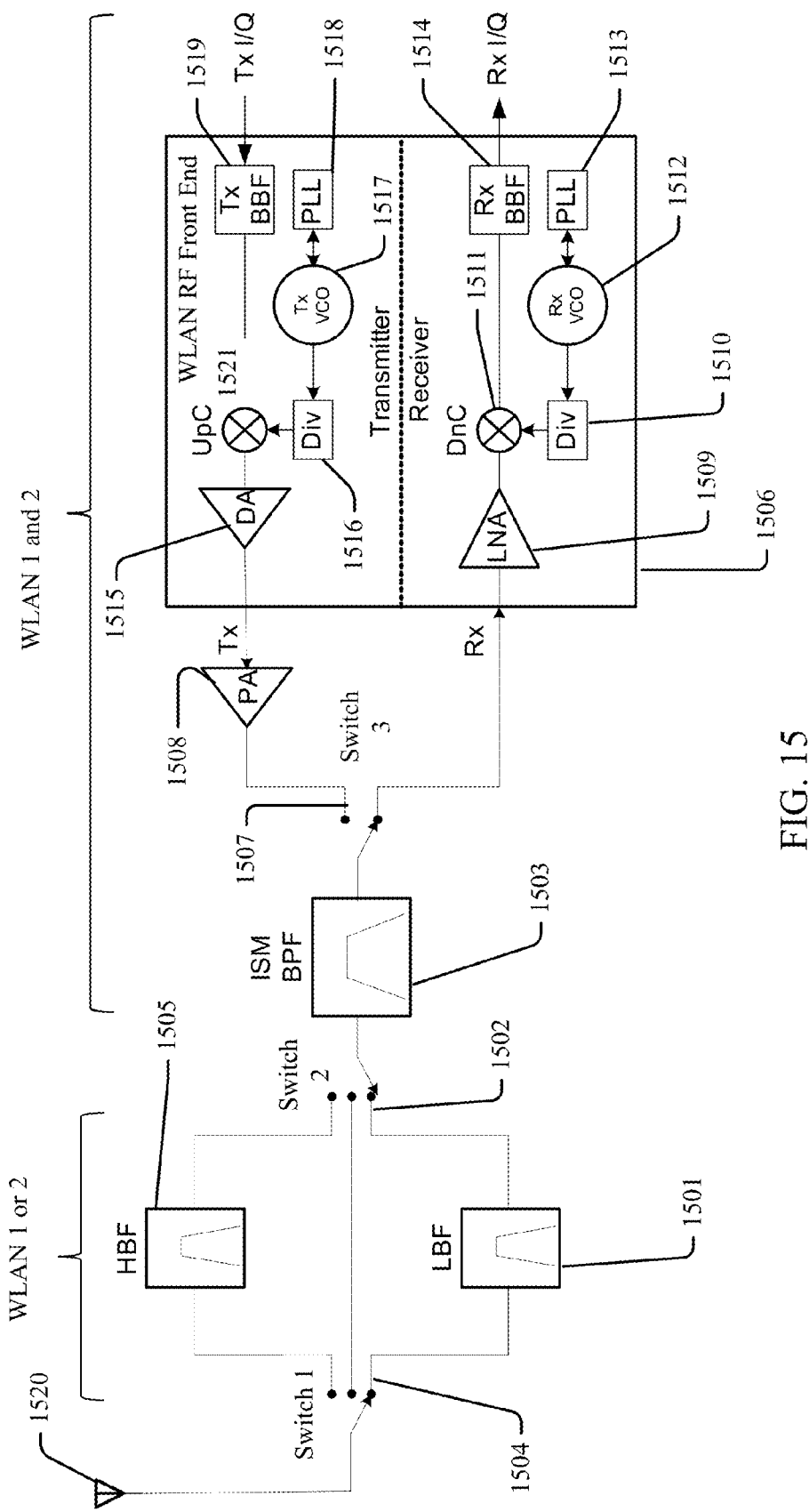
FIG. 15 illustrates an example of a multi-radio wireless device according to one aspect of the present disclosure.

FIG. 15 illustrates an example of an implementation of a frequency selectivity operation according to an aspect of the present disclosure. The implementation illustrated in FIG. 15 may be implemented as discreet components or as components defined within a single chip. The frequency selectivity operation may also be implemented using different components in a different arrangement. Although the components of FIG. 15 are illustrated with a high band/low band configuration, other band configurations may be configured.

As illustrated in FIG. 15 a high band channelization filter 1505 and low band channelization filter 1501 may be defined on at least one of the WLAN radios, such as WLAN 1 or WLAN 2. FIG. 15 also illustrates components of a WLAN radio frequency (RF) front end 1506 that may be common to both WLAN 1 and WLAN 2.

According to one aspect, the implementation of a frequency selectivity operation includes an antenna 1520, a first switch 1504, the high band filter 1505, the low band filter 1501, and a second switch 1502. Furthermore, the components that may be common to both WLAN radios include an ISM band pass filter 1503, a third switch 1507 for switching between transmission and reception operations, a power amplifier (PA) 1508, a low-noise amplifier (LNA) 1509, a divider (DIV) 1510, a downconverter (DnC) 1511, a receiving voltage control oscillator (VCO) 1512, a receiving base band filter (BBF) 1514, a phased lock loop (PLL) 1513, a distributed amplifier (DA) 1515, a DIV 1516, a upconverter (UpC) 1521, a transmitting VCO 1517, a transmission BBF 1519, and a PLL 1518.

According to one aspect, when utilizing a frequency selectivity operation the coexistence manager may control the first switch 1504 and the second switch 1502 in order utilize a high band filter path, a low band filter path, or a path coupled to a band pass filter that bypasses a high band filter and a low band filter.

In one aspect, as an example, the frequency selection operation may be implemented for a first WLAN radio (WLAN1). To mitigate potential interference the coexistence manager may control the first switch 1504 and the second switch 1502 to couple with the low band filter path connected to the low band filter 1501 when the events for the first WLAN radio are in the low band and the events for a second WLAN radio are in the high band.

Furthermore, to mitigate potential interference, the coexistence manager may control the first switch 1504 and the second switch 1502 to couple with the high band filter path connected to the high band filter 1505 when the events for the first WLAN radio are in the high band and the events for a second WLAN radio are in the low band. Finally, the coexistence manager may control the first switch 1504 and the second switch 1502 to be coupled with the band pass filter path connected to neither the high band filter 1505 nor the low band filter 1501 when utilizing a dual-band operation, where each WLAN radio's band pass filter covers the band for its intended operational band, or in single-band operation, where the coexistence manager operates in TDM mode.

The operations of the coexistence manager may be similar to the operations discussed above with regard to the first WLAN radio if the frequency selection operation is be implemented for a second WLAN radio. For example, to mitigate potential interference, the coexistence manager may control the first switch 1504 and the second switch 1502 to couple with the low band filter path when the second WLAN radio events are in the low band and the first WLAN events are in the high band. Moreover, to mitigate potential interference, the coexistence manager may control the first switch 1504 and the second switch 1502 to couple with the high band filter path when the second WLAN radio events are in the high band and the first WLAN events are in the low band. Finally, the coexistence manager may control the first switch 1504 and the second switch 1502 to be coupled with the band pass filter path that is connected to neither the high band filter 1505 nor the low band filter 1501 when utilizing a dual-band operation, where each WLAN radio's band pass filter covers the band for its intended operational band, or in single-band operation, where the coexistence manager operates in TDM mode.

The solutions described herein may mitigate potential interference in various devices that include at least two radios. For example, in one aspect, a coexistence manager may mitigate potential interference between a first WLAN radio and a second WLAN radio operating on the same device. In this example, the first WLAN radio may operate in an access point mode such that external devices may obtain WiFi access via the first WLAN radio, and the second WLAN radio may operate in a station mode such that the device may connect to an external access point.

Furthermore, the coexistence manager may be configured to mitigate a potential interference between the first WLAN radio described in the example above and a WWAN radio operating concurrently. Alternatively, the coexistence manager may be configured to mitigate a potential interference between the first WLAN radio described in the example above and a WWAN radio operating concurrently. Finally, the coexistence manager may be configured to mitigate a potential interference between the first WLAN radio and second WLAN radio described in the example above and a WWAN radio operating concurrently.

It should be noted that the coexistence manager may mitigate other types of potential interference in addition to the potential interference scenarios described herein. For example, the coexistence manager may mitigate potential interference on a device with a single WLAN radios, or chips, and other co-located radios, such as an LTE radio. As another example, the coexistence manager may mitigate potential interference on a device with at least two WLAN radios, or chips, and other co-located radios, such as an LTE radio. Thus, the solutions described herein may be incorporated on their own or together, and may be combined in whole or in part with those discussed in co-owned patent application Ser. No. 11/549,651, filed Aug. 28, 2009 in the names of WIETFELDT et al., co-owned patent application Ser. No. 11/549,678, filed Aug. 28, 2009 in the names of WIETFELDT et al., co-owned patent application Ser. No. 11/822,026, filed Jun. 23, 2010 in the names of WIETFELDT et al., co-owned patent application Ser. No. 13/074,886, filed Mar. 29, 2011 in the names of CHRISIKOS et al., and co-owned patent application Ser. No. 13/074,913, filed Mar. 29, 2011 in the names of CHRISIKOS et al. which are hereby expressly incorporated by reference in their entireties.

It should also be noted that the solutions and aspects described in the disclosure are not limited to mitigating potential interference on a single WLAN radio, or chip, operating in at least two modes, or co-located WLAN radios, or chips. Specifically, the solutions and aspects described in the disclosure may be applicable to devices with a single radio operating in dual modes, or at least two co-located radios, such as a Bluetooth radio or co-located Bluetooth radios.

Furthermore, the solutions and configurations described in this disclosure are not limited to a device having co-located WLAN radios. Specifically, the co-located radios may be of any RAT, or any RAT that may operate in dual modes. For example, the co-located radios may be LTE radios, or in another example, one radio may be an LTE radio and another radio may be a WCDMA radio.

In a conventional system, an LTE radio operates in a client mode slaved to the LTE Base Station (e.g., master). The emerging LTE Direct standard specifies for one LTE radio to operate as a "master" communicating with one or more LTE "slaves" independent from the Base Station. Accordingly, both LTE and LTE Direct modes may concurrently operate. The concurrent operation may be substantially similar to the aforementioned WLAN dual mode operation (e.g., station mode and access point modes). Thus, as previously discussed, the solutions and configurations described in this disclosure may be applicable to the operation of dual LTE radios in a single device.

Figure 16:
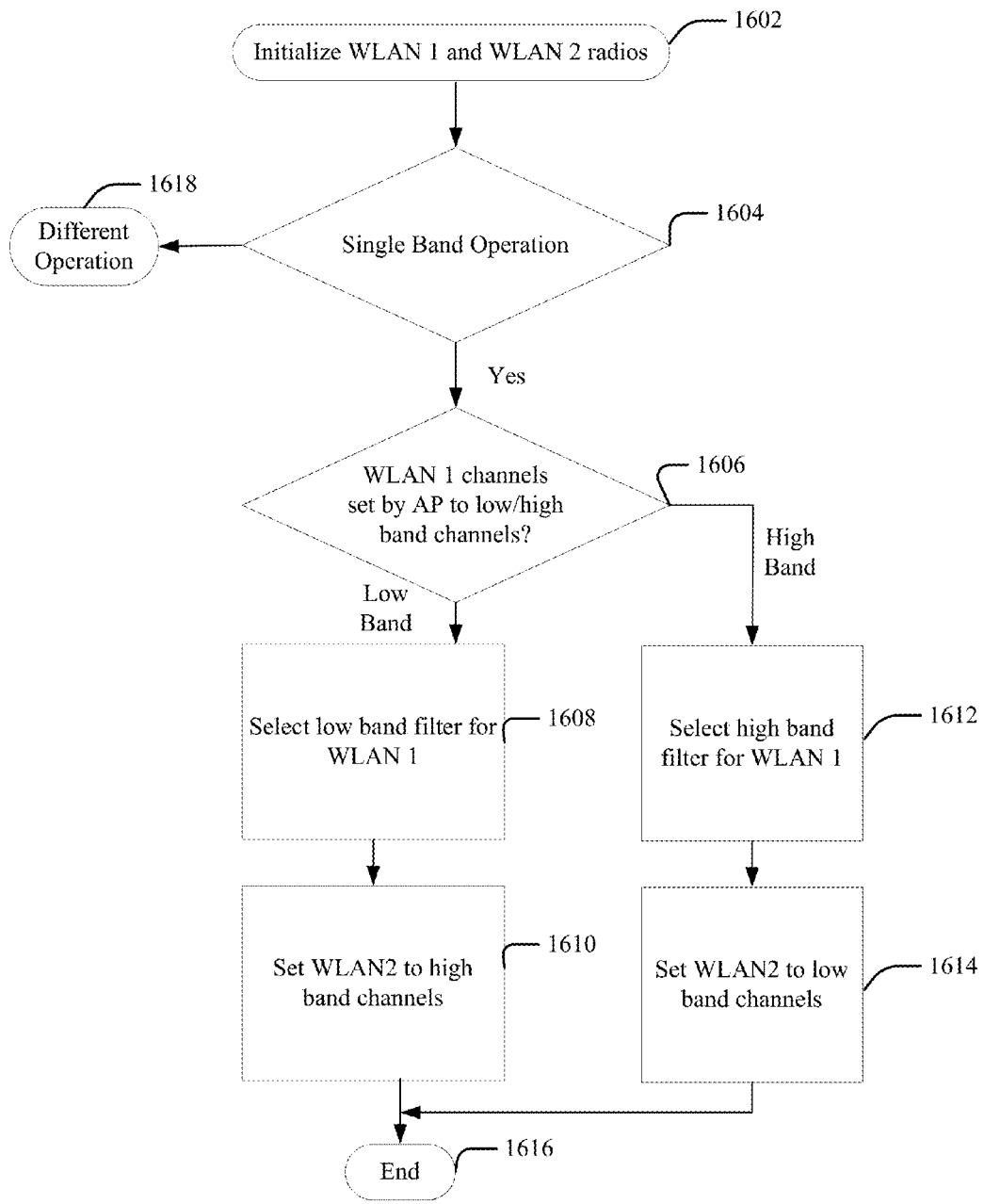
FIG. 16 is a flow diagram illustrating a multi radio interference mitigation process when the radios operate simultaneously on a same frequency band.

FIG. 16 is a flow diagram illustrating a multi radio interference mitigation process when the radios operate simultaneously on a same frequency band. The process starts at block 1602 where radios WLAN 1 and WLAN 2 are initialized by the UE. The process continues to block 1604 where it is determined whether a single band operation for the radios WLAN 1 and WLAN 2 is implemented. If a single band operation is implemented, the process continues to block 1606 where a setting of the WLAN 1 channel is determined. Otherwise, the process continues to block 1618 to implement a different frequency band selection operation, for example. The WLAN 1 channel may be set by an AP to a low band channel set (e.g., channel 1) or a high band channel set (e.g., channel 11). At block 1606, if the WLAN 1 channel is set to a low-band channel, the process continues to block 1608 where a low band filter is selected for WLAN1. The coexistence manager of the UE may set switches such as the switches 1504 and 1502 (e.g., a single pole triple throw (SP3T) switches) to select the low-band filter. As a result, WLAN 2 is set to a high band channel by the coexistence manager at block 1610 after which the process ends at block 1616. If the WLAN 1 channel is set to a high-band channel, the process continues to block 1612 where a high band filter is selected (by the switches) for WLAN1. As a result, WLAN 2 is set to a low band channel at block 1614, after which the process ends at block 1616.

Figure 17:
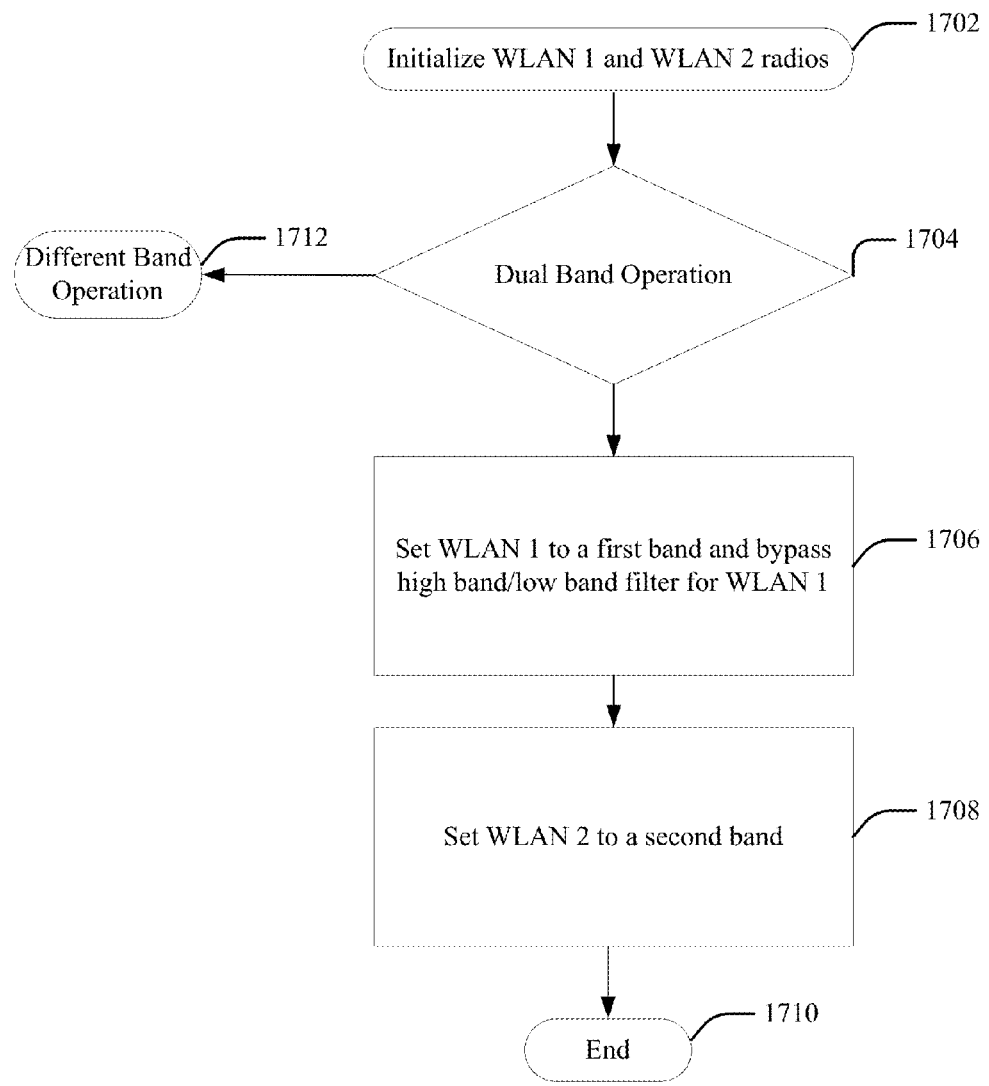
FIG. 17 is a flow diagram illustrating a multi radio interference mitigation process when the radios operate simultaneously on different frequency bands.

FIG. 17 is a flow diagram illustrating a multi radio interference mitigation process when they operate simultaneously on different frequency bands. The process starts at block 1702 where radios WLAN 1 and WLAN 2 are initialized by the UE. The process continues to block 1704 where it is determined whether a dual band operation for the radios WLAN 1 and WLAN 2 is implemented. If the dual band operation is implemented, the process continues to block 1706 where the WLAN 1 radio is set to a first frequency. For example, the coexistence manager sets the switches 1504 and 1502 to a middle position to bypass the high/low band filter configuration associated with the single band operation. The process then continues to block 1708 where the WLAN 2 radio is set to a second band after which the process ends at block 1710. Otherwise, if the dual band operation is not implemented at block 1704, the process continues to block 1712 where a different frequency band selection operation, for example, is implemented.

Figure 18:
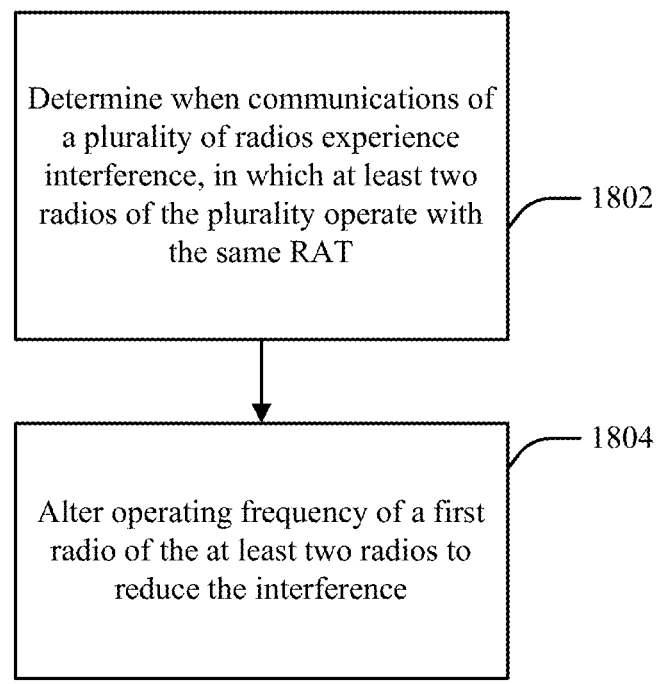
FIG. 18 is a block diagram illustrating a method for mitigating interference according to one aspect of the present disclosure.

As shown in FIG. 18 a UE may determine when communications of a plurality of radios experience interference, in which at least two radios of the plurality of radios operate with the same radio access technology, as shown in block 1802. Additionally, a UE may alter an operating frequency of a first radio of the at least two radios to mitigate the interference, as shown in block 1804.

Figure 19:
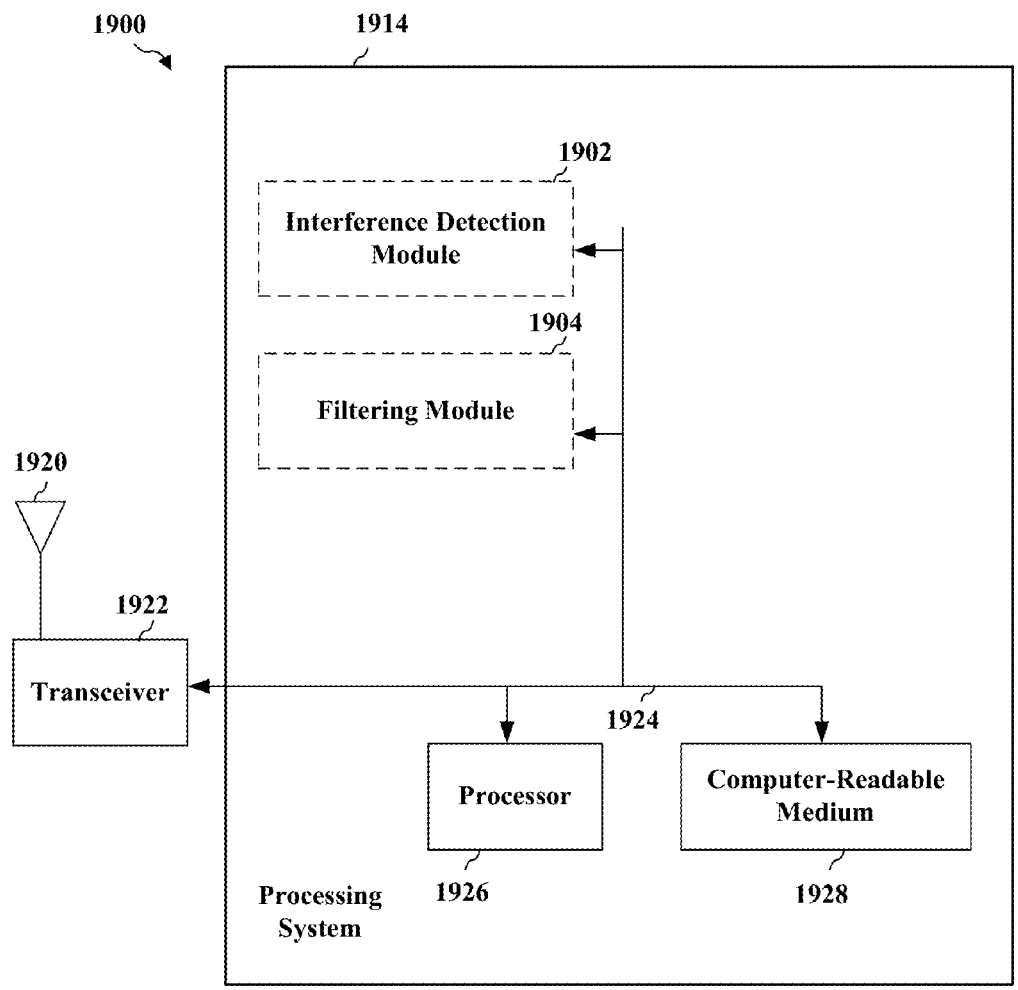
FIG. 19 is a diagram illustrating an example of a hardware implementation for an apparatus employing components for mitigating interference.

FIG. 19 is a diagram illustrating an example of a hardware implementation for an apparatus 1900 employing a coexistence mitigation system 1914. The co-existence mitigation system 1914 may be implemented with a bus architecture, represented generally by a bus 1924. The bus 1924 may include any number of interconnecting buses and bridges depending on the specific application of the co-existence mitigation system 1914 and the overall design constraints. The bus 1924 links together various circuits including one or more processors and/or hardware modules, represented by a processor 1926, an interference detection module 1902, a filtering module 1904, and a computer-readable medium 1928. The bus 1924 may also link various other circuits such as timing sources, peripherals, voltage regulators, and power management circuits, which are well known in the art, and therefore, will not be described any further.

The apparatus includes the co-existence mitigation system 1914 coupled to a transceiver 1922. The transceiver 1922 is coupled to one or more antennas 1920. The transceiver 1922 provides a means for communicating with various other apparatus over a transmission medium. The co-existence mitigation system 1914 includes the processor 1926 coupled to the computer-readable medium 1928. The processor 1926 is responsible for general processing, including the execution of software stored on the computer-readable medium 1928. The software, when executed by the processor 1926, causes the co-existence mitigation system 1914 to perform the various functions described supra for any particular apparatus. The computer-readable medium 1928 may also be used for storing data that is manipulated by the processor 1926 when executing software. The co-existence mitigation system 1914 further includes the interference detection module 1902 for determining when communications of a plurality of radios experience interference, in which at least two radios of the plurality of radios operate with the same radio access technology, and the filtering module 1904 for altering an operating frequency of a first radio of the at least two radios to mitigate the interference. The interference detection module 1902 and the filtering module 1904 may be software modules running in the processor 1926, resident/stored in the computer readable medium 1928, one or more hardware modules coupled to the processor 1926, or some combination thereof. The co-existence mitigation system 1914 may be a component of the UE 250 and may include the memory 272 and/or the processor 270.

In one configuration, the apparatus 1900 for wireless communication includes means for determining and means for altering. The means may be the interference detection module 1902, the filtering module 1904, coexistence manager 640, processor 230/270, memory 232/272, antenna 224/252, and/or the co-existence mitigation system 1914 configured to perform the functions recited by the means. In another aspect, the aforementioned means may be any module or any apparatus configured to perform the functions recited by the aforementioned means.

The examples above describe aspects implemented in an LTE system. However, the scope of the disclosure is not so limited. Various aspects may be adapted for use with other communication systems, such as those that employ any of a variety of communication protocols including, but not limited to, CDMA systems, TDMA systems, FDMA systems, and OFDMA systems.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the present disclosure is not intended to be limited to the aspects shown herein but is to be accorded the widest scope consistent with the principles and novel features disclosed herein.

What is claimed is:

1. A method of wireless communication, comprising:
   operating, at a user equipment (UE), at least two radios of a plurality of radios within the UE with a same radio access technology and on a same frequency band;
   setting a first portion of the frequency band for operating a first radio of the at least two radios of the UE;
   filtering communications of the first radio and a second radio of the at least two radios, at the UE, to respectively operate in the first portion of the frequency band and a second portion of the frequency band to avoid in-device interference between the at least two radios within the UE caused by the at least two radios operating at a same time; and assigning the second radio to another frequency band and bypassing the filtering communications of the first radio and the second radio when the other frequency band is available.

2. The method of claim 1, in which the filtering comprises filtering communications of the first radio with a high band filter when the first portion comprises a high band portion of the frequency band and filtering communications of the second radio with a low band filter when the second radio is set to operate on the second portion of the frequency band, the second portion comprising a low band portion of the frequency band.

3. The method of claim 1, in which the filtering comprises filtering communications of the first radio with a low band filter when the first portion comprises a low band portion of the frequency band and filtering communications of the second radio with a high band filter when the second radio is set to operate on the second portion of the frequency band, the second portion comprising a high band portion of the frequency band.

4. The method of claim 1, in which the second radio is configured to operate in an access point mode, and the first radio is configured to operate in a station mode.

5. The method of claim 1, in which the at least two radios are configured to operate with two or more channelization filters.

6. An apparatus configured for wireless communication, comprising:
at least two radios of a plurality of radios within a user equipment (UE), in which the at least two radios operate with a same radio access technology on a same frequency band;
a first processor for setting, at the UE, a first portion of the frequency band for operating a first radio of the at least two radios of the UE;
means for filtering, at the UE, communications of the first radio and a second radio of the at least two radios to respectively operate in the first portion of the frequency band and a second portion of the frequency band to avoid in-device interference between the at least two radios within the UE caused by the at least two radios operating at a same time; and
a second processor for assigning the second radio to another frequency band and bypassing the filtering communications of the first radio and the second radio when the other frequency band is available.

7. The apparatus of claim 6, in which the means for filtering comprises means for filtering communications of the first radio with a high band filter when the first portion comprises a high band portion of the frequency band and means for filtering communications of the second radio with a low band filter when the second radio is set to operate on the second portion of the frequency band, the second portion comprising a low band portion of the frequency band.

8. The apparatus of claim 6, in which the means for filtering comprises means for filtering communications of the first radio with a low band filter when the first portion comprises a low band portion of the frequency band and means for filtering communications of the second radio with a high band filter when the second radio is set to operate on the second portion of the frequency band, the second portion comprising a high band portion of the frequency band.

9. A non-transitory computer-readable medium having non-transitory program code recorded thereon, the non-transitory program code comprising:
program code to operate, at a user equipment (UE), at least two radios of a plurality of radios within the UE with a same radio access technology and on a same frequency band;
program code to set a first portion of the frequency band for operating a first radio of the at least two radios of the UE;
program code to filter communications of the first radio and a second radio of the at least two radios, at the UE, to respectively operate in the first portion of the frequency band and a second portion of the frequency band to avoid in-device interference between the at least two radios within the UE caused by the at least two radios operating at a same time; and
program code to assign the second radio to another frequency band and to bypass filtering communications of the first radio and the second radio when the other frequency band is available.

10. The computer-readable medium of claim 9, in which the program code to filter comprises program code to filter communications of the first radio with a high band filter when the first portion comprises a high band portion of the frequency band and program code to filter communications of the second radio with a low band filter when the second radio is set to operate on the second portion of the frequency band, the second portion comprising a low band portion of the frequency band.

11. The computer-readable medium of claim 9, in which the program code to filter comprises program code to filter communications of the first radio with a low band filter when the first portion comprises a low band portion of the frequency band and program code to filter communications of the second radio with a high band filter when the second radio is set to operate on the second portion of the frequency band, the second portion comprising a high band portion of the frequency band.

12. An apparatus configured for wireless communication, the apparatus comprising:
a memory; and
at least one processor coupled to the memory, the at least one processor being configured:
to operate, at a user equipment (UE), at least two radios of a plurality of radios within the UE with a same radio access technology and on a same frequency band;
to set a first portion of the frequency band for operating a first radio of the at least two radios of the UE;
to filter communications of the first radio and a second radio of the at least two radios, at the UE, to respectively operate in the first portion of the frequency band and a second portion of the frequency band to avoid in-device interference between the at least two radios within the UE caused by the at least two radios operating at a same time; and
to assign the second radio to another frequency band and to bypass filtering communications of the first radio and the second radio when the other frequency band is available.

13. The apparatus of claim 12, in which the at least one processor configured to filter comprises the at least one processor configured to filter communications of the first radio with a high band filter when the first portion comprises a high band portion of the frequency band and configured to filter communications of the second radio with a low band filter when the second radio is set to operate on the second portion of the frequency band, the second portion comprising a low band portion of the frequency band.

14. The apparatus of claim 12, in which the at least one processor configured to filter comprises the at least one processor configured to filter communications of the first radio with a low band filter when the first portion comprises a low band portion of the frequency band and configured to filter communications of the second radio with a high band filter when the second radio is set to operate on the second portion of the frequency band, the second portion comprising a high band portion of the frequency band.

15. The apparatus of claim 12, in which the second radio is configured to operate in an access point mode, and the first radio is configured to operate in a station mode.

16. The apparatus of claim 12, in which the at least two radios are configured to operate with two or more channelization filters.

17. The method of claim 1, in which the same radio access technology comprises a wireless local area network (WLAN) operating in a 2.4 GHz frequency band.

18. The method of claim 1, in which the first radio and the second radio are configured to operate in an access point mode.

19. The method of claim 1, in which the setting comprises accounting for potential interference with different radio access technologies (RATs).

20. The apparatus of claim 12, in which the same radio access technology comprises a wireless local area network (WLAN) operating in a 2.4 GHz frequency band.

21. The apparatus of claim 12, in which the first radio and the second radio are configured to operate in an access point mode.

22. The apparatus of claim 12, in which the at least on processor is configured to set the first portion while accounting for potential interference with different radio access technologies (RATs).

* * * * *